(12) United States Patent
Miyamoto

(10) Patent No.: US 11,281,341 B2
(45) Date of Patent: Mar. 22, 2022

(54) ACTIVE PEN AND SENSOR INTEGRATED CIRCUIT

(71) Applicant: Wacom Co., Ltd., Saitama (JP)

(72) Inventor: Masayuki Miyamoto, Saitama (JP)

(73) Assignee: Wacom Co., Ltd., Saitama (JP)

( * ) Notice: Subject to any disclaimer, the term of this patent is extended or adjusted under 35 U.S.C. 154(b) by 0 days.

(21) Appl. No.: 17/091,448

(22) Filed: Nov. 6, 2020

(65) Prior Publication Data

US 2021/0055829 A1 Feb. 25, 2021

Related U.S. Application Data

(63) Continuation of application No. PCT/JP2018/025755, filed on Jul. 6, 2018.

(51) Int. Cl.
*G06F 3/044* (2006.01)
*H04W 72/04* (2009.01)

(52) U.S. Cl.
CPC .......... *G06F 3/0441* (2019.05); *G06F 3/0442* (2019.05); *H04W 72/042* (2013.01); *H04W 72/0446* (2013.01); *H04W 72/0453* (2013.01)

(58) Field of Classification Search
CPC .. G06F 3/03545; G06F 3/0442; G06F 3/0441; G06F 3/04166; G06F 3/0446; G06F 2203/04104; G06F 3/03; H04W 72/042; H04W 72/0446; H04W 72/0453
USPC ........................................................ 345/179
See application file for complete search history.

(56) References Cited

U.S. PATENT DOCUMENTS 9,495,024 B2 * 11/2016 Watanabe ............. G06F 3/0412
2010/0173680 A1 * 7/2010 Vu ....................... G06F 3/04166
455/566
2012/0327041 A1 12/2012 Harley et al.
(Continued)

OTHER PUBLICATIONS

International Search Report, dated Sep. 11, 2018, for International Application No. PCT/JP2018/025755, 1 page.
(Continued)

*Primary Examiner* — Koosha Sharifi-Tafreshi
(74) *Attorney, Agent, or Firm* — Seed IP Law Group LLP

(57) ABSTRACT

An active pen is provided, which facilitates avoiding complex computation for phase acquisition on the side of a sensor integrated circuit configured to receive downlink signals from active pens, and allows for generating carrier waves for the downlink signals using a simple configuration, namely, a frequency dividing circuit, while reducing a difference in unused time in one time slot between the active pens. An active pen 2 is configured to transmit one or more symbol values in one time slot, and includes a frequency dividing circuit 43 configured to frequency-divide a reference clock with a frequency division ratio based on each of a plurality of frequencies different from each other, to thereby generate a plurality of carrier waves having frequencies different from each other. The active pen 2 includes a modulation (transmission) circuit 44 configured to transmit a first downlink signal in a symbol duration that is common among the plurality of frequencies, the first downlink signal obtained by modulating a first carrier wave, which is among the plurality of carrier waves generated by the frequency dividing circuit 43, with a value of a first symbol that is a transmission target.

13 Claims, 14 Drawing Sheets

(56) References Cited

U.S. PATENT DOCUMENTS

2016/0246390 A1     8/2016   Lukanc et al.
2016/0299583 A1    10/2016   Watanabe

OTHER PUBLICATIONS

Kim et al., "A High Noise Immunity, 28 X 16-Channel Finger Touch Sensing IC Using OFDM and Frequency Translation Technique," *Sensors* 18(5): 1652, May 21, 2018.

German Office Action, received Oct. 7, 2021, for German Application No. 112018007811.6, 12 pages.

\* cited by examiner

ACTIVE PEN AND SENSOR INTEGRATED CIRCUIT

BACKGROUND

Technical Field

The present invention relates to an active pen configured to transmit a downlink signal to a position detecting device, and a sensor integrated circuit for receiving the downlink signal transmitted by the active pen.

Description of the Art

Position detecting systems that support input with an active pen are lately desired to support simultaneous input with a plurality of active pens, and some technologies have been proposed to meet such demand. In one of the technologies, a plurality of active pens transmit downlink signals at different frequencies in the same time slot so that the plurality of active pens can transmit the downlink signals simultaneously. Patent Document 1 discloses an example of such technology.

PRIOR ART DOCUMENT

Patent Document

Patent Document 1: U.S. Patent Application Publication No. 2016/0246390.

BRIEF SUMMARY

Technical Problems

The inventors of the present application have considered use of a frequency dividing circuit as the simplest configuration to achieve downlink signals having different frequencies. In a case where, for example, a reference clock having 8 MHz is used, a signal having 500 kHz, a signal having 333.3 kHz, and a signal having 250 kHz can be created through frequency division by $\frac{1}{16}$, $\frac{1}{24}$, and $\frac{1}{32}$, respectively. When downlink signals can be generated using these frequencies, carrier waves for the downlink signals can be created using a simple configuration, namely, the frequency dividing circuit.

As a result of more detailed study, however, it has been discovered that the configuration which simply uses the frequency dividing circuit has the following problems: computation on the side of a sensor integrated circuit configured to receive the downlink signals becomes complex, and different active styluses have largely different unused time within one time slot such that time cannot be effectively utilized. The following describes the problems in detail.

FIG. 14 is a diagram illustrating the configurations of downlink signals according to the background art of the present invention. Note that, the technology illustrated in FIG. 14 itself has been devised by the inventors of the present application, and was not published at the time of the filing of the present application. FIG. 14 illustrates an example in which the downlink signal is configured with a pulse signal modulated by binary phase-shift keying (BPSK). In the example in FIG. 14, one symbol (a group of digital data that is sent per modulation) thus includes one bit. Further, in the example illustrated in FIG. 14, an active pen 1 transmits a downlink signal at 500 kHz, an active pen 2 transmits a downlink signal at 333.3 kHz, and an active pen 3 transmits a downlink signal at 250 kHz. In addition, in the example illustrated in FIG. 14, the duration of one time slot is 0.25 msec, and the size of data that is transmitted in one time slot is 21 bits.

In order to avoid the generation of harmonic noise, duration that is used for the transmission of one symbol (the duration of a window W illustrated in FIG. 14, hereinafter referred to as a "symbol duration") is desirably set to a value equal to an integer multiple of the period of the pulse signal. When the symbol duration is set to such value, however, as illustrated in FIG. 14, values of the symbol durations differ between the frequencies. In the example in FIG. 14, the symbol duration is 10 μsec in the case where the frequency is 500 kHz, the symbol duration is 9 μsec in the case where the frequency is 333.3 kHz, and the symbol duration is 8 μsec in the case where the frequency is 250 kHz. This means that the start position and end position of the window W differ between the frequencies, resulting in complex computation for phase acquisition on the side of a sensor integrated circuit configured to receive the downlink signals.

Further, as illustrated in FIG. 14, there arises a problem that a large difference exists in unused time in one time slot between the active pens. For example, a difference in unused time between the active pen 1 configured to use the downlink signal having 500 kHz and the active pen 3 configured to use the downlink signal having 250 kHz is 82−40=42 μsec. This 42 μsec can be considered as time that cannot be effectively utilized.

It is therefore one object of the present invention to provide an active pen and a sensor integrated circuit capable of avoiding complex computation for phase acquisition on the side of a sensor integrated circuit configured to receive downlink signals, which are also capable of generating carrier waves for the downlink signals using a simple configuration, namely, a frequency dividing circuit, and are further capable of reducing a difference in unused time in one time slot between active pens.

Technical Solution

An active pen according to one aspect of the present invention is an active pen configured to transmit one or more symbol values in one time slot, the active pen including: a frequency dividing circuit configured to frequency-divide a reference clock with a frequency division ratio based on each of a plurality of frequencies different from each other, to thereby generate a plurality of carrier waves having frequencies different from each other; and a transmission circuit configured to transmit a first downlink signal in a symbol duration that is common among the plurality of frequencies, wherein the first downlink signal is obtained by modulating a first carrier wave, which is generated by the frequency dividing circuit, with a value of a first symbol that is a transmission target.

A sensor integrated circuit according to one aspect of the present invention is a sensor integrated circuit connected to a sensor electrode group, and configured to detect, based on a charge induced in the sensor electrode group, a plurality of downlink signals transmitted from one or more active pens by using one of a predetermined plurality of frequencies different from each other, to thereby detect a specified position based on each of the detected plurality of downlink signals and demodulate a value of a symbol transmitted by each of the detected plurality of downlink signals. The sensor integrated circuit includes: an analog-to-digital (AD) conversion circuit configured to acquire a reception level value corresponding to a charge induced in one of a plurality of sensor electrodes of the sensor electrode group; and a plurality of demodulation circuits each corresponding to one of the predetermined plurality of frequencies different from each other, and configured to perform frequency analysis on a series of the reception level values at a corresponding frequency to acquire one of the plurality of downlink signals transmitted at the corresponding frequency, and perform, per a symbol duration that is common among the predetermined plurality of frequencies, phase analysis on the acquired downlink signal, to thereby acquire the value of the symbol transmitted by the acquired downlink signal.

Advantageous Effects

According to the present invention, the symbol durations of the downlink signals transmitted from the respective active pens are equal to each other, and hence it is possible to avoid complex computation for phase acquisition on the side of the sensor integrated circuit configured to receive the downlink signals. Carrier waves for the downlink signals can be generated using a simple configuration, namely, a frequency dividing circuit. Further, the total durations of the downlink signals transmitted from the respective active pens are equal to each other, and hence it becomes possible to reduce the difference in unused time in one time slot between the active pens.

BRIEF DESCRIPTION OF DRAWINGS

FIG. 5 is a diagram illustrating the functional blocks of a signal processing circuit 26 in the active pen 2a.

FIG. 11 is a diagram illustrating a first modified example of the active pen 2a.

FIG. 12 is a diagram illustrating a second modified example of the active pen 2a.

MODES FOR CARRYING OUT THE INVENTION

Now, an embodiment of the present invention is described in detail with reference to the attached drawings.

Figure 1:
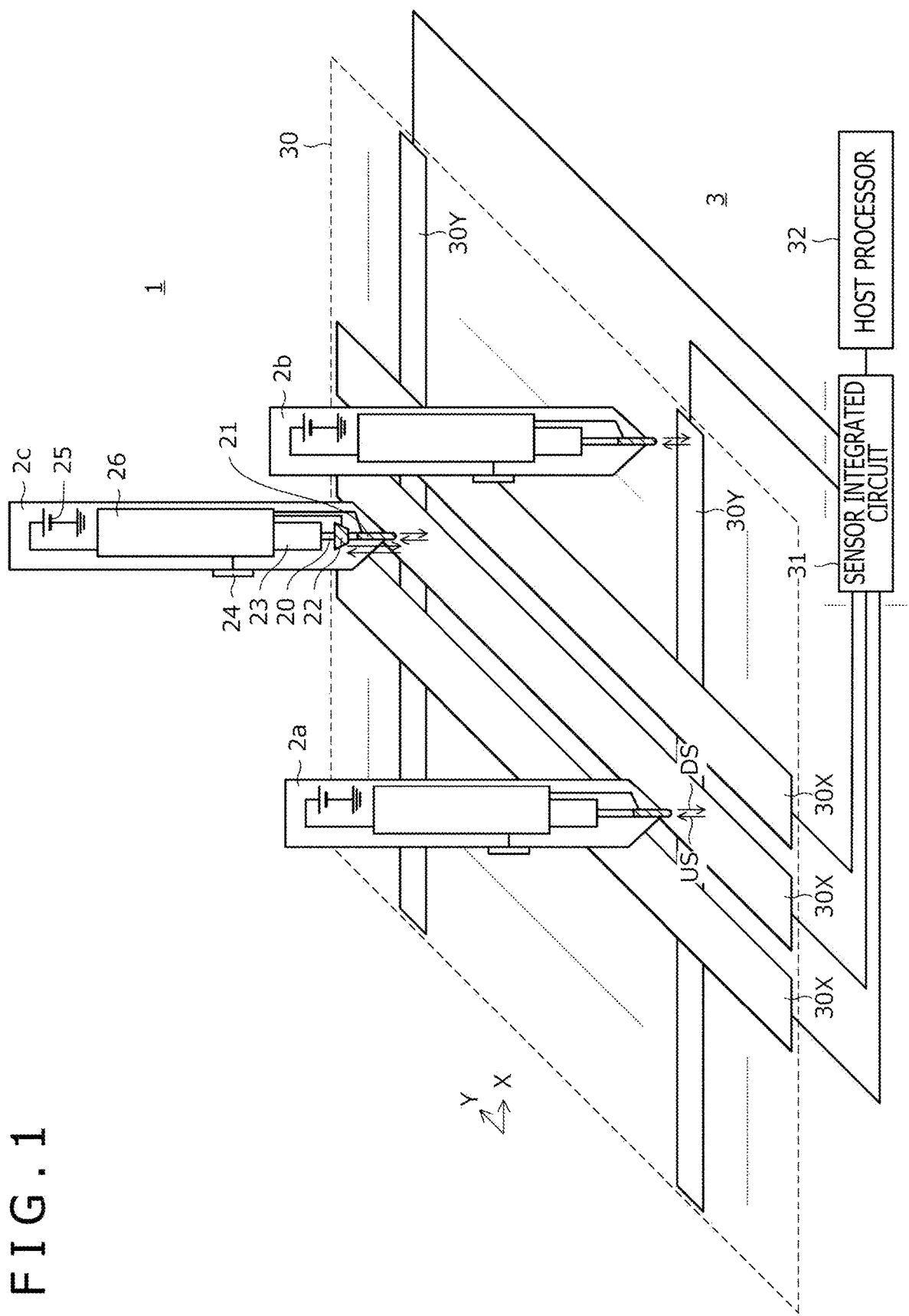
FIG. 1 is a diagram illustrating the entire configuration of a position detecting system 1 according to a first embodiment of the present invention.

FIG. 1 is a diagram illustrating an example of the entire configuration of a position detecting system 1 according to a first embodiment of the present invention. As illustrated in FIG. 1, the position detecting system 1 includes a plurality of active pens 2a to 2c and a position detecting device 3. In the following description, the active pens 2a to 2c are sometimes collectively referred to as an active pen 2 in a case where there is no need to distinguish the active pens 2a to 2c from each other.

The active pens 2a to 2c are each an electronic pen of an active capacitive type, for example. Of those, the active pen 2c includes, as illustrated in FIG. 1, a core 20, electrodes 21 and 22, a pen pressure detecting circuit 23, a switch 24, a power supply 25, and a signal processing circuit 26. Further, the active pens 2a and 2b have a configuration similar to that of the active pen 2c except that the active pens 2a and 2b do not include the electrode 22. The configuration of the active pen 2 is described below by paying attention to the active pen 2c, but the active pens 2a and 2b have a similar configuration except for the configuration related to the electrode 22.

The electrodes 21 and 22 are each a conductor provided in the vicinity of the core 20 and are electrically connected to the signal processing circuit 26 by wiring. The electrode 22 is provided at a position that is farther from the tip (pen tip) of the core 20 than the position of the electrode 21, and is typically used by the position detecting device 3 to detect the inclination of the active pen 2.

The pen pressure detecting circuit 23 is a circuit configured to detect pressure (pen pressure) applied to the tip (pen tip) of the core 20. To be specific, the pen pressure detecting circuit 23 abuts against the rear end portion of the core 20, and detects, through this abutment, pressure that is applied to the core 20 when a user presses the pen tip of the active pen 2 against a touch screen. In the specific example, the pen pressure detecting circuit 23 includes a variable capacitance module whose capacitance is varied depending on the pressure applied to the pen tip.

The switch 24 is a switch provided on the side surface of the active pen 2 and is configured to be turned on and off by the user. The power supply 25 supplies operating power (direct current (DC) voltage) to the signal processing circuit 26 and includes a cylindrical AAAA battery, for example.

The signal processing circuit 26 is a processing circuit that includes a circuit group formed on a substrate, which is not illustrated, and that is connected to each of the electrodes 21 and 22, the pen pressure detecting circuit 23, and the switch 24. The signal processing circuit 26 is configured to transmit and receive signals to and from the position detecting device 3 by using the electrodes 21 and 22. In the following, of the signals that are transmitted and received in this way, a signal that is transmitted from the position detecting device 3 to the active pen 2 is referred to as a uplink signal US, and a signal that is transmitted from the active pen 2 to the position detecting device 3 is referred to as a downlink signal DS.

The uplink signal US includes a command representing the content of control applied to the active pen 2. The downlink signal DS includes a burst signal, which is an unmodulated carrier wave signal, and a data signal, which is a carrier wave signal modulated with predetermined data. The signal processing circuit 26 acquires, in accordance with the command included in the uplink signal US, data to be transmitted in the data signal, and modulates the carrier wave signal with the acquired data, to thereby generate and transmit the data signal. The data that is transmitted in the data signal includes, for example, pen pressure that is detected by the pen pressure detecting circuit 23, information representing the ON/OFF state of the switch 24, and a pen identifier (ID) written in the signal processing circuit 26 in advance.

The uplink signal US and the downlink signal DS are transmitted and received in a unit of frame. This frame is, for example, the display period of one screen of a display included in the position detecting device 3 as described later. In the typical example, the uplink signal US is transmitted at the leading end of the frame and the downlink signal DS is subsequently transmitted. In this case, the uplink signal US plays a role of notifying the active pen 2 of the start timing of the frame. The transmission time of the downlink signal DS in the frame is divided into a plurality of time slots, and in each time slot, the downlink signals DS having a predetermined number of symbols are simultaneously transmitted by the plurality of active pens 2.

In order that the position detecting device 3 can positively demodulate the downlink signals DS even when the plurality of active pens 2 simultaneously transmit the downlink signals DS in one time slot, in the present embodiment, a plurality of frequencies orthogonal to each other are used as the frequencies of the carrier waves of the downlink signals DS. The idea of the plurality of frequencies orthogonal to each other is based on OFDM that is generally used in the field of wireless communication including a wireless local area network (LAN) and the Third Generation Partnership Project (3GPP), for example. In addition, in the present embodiment, the symbol durations have the same value irrespective of the frequencies, thereby avoiding complex computation for phase acquisition on the side of a sensor integrated circuit 31 configured to receive the downlink signals DS, and achieving a reduction in difference in unused time in one time slot between the active pens 2. These points are described in detail later.

The position detecting device 3 is a device including the touch screen and configured to detect a position of each of the active pens 2 in the touch screen. The position detecting device 3 is typically a computer such as a tablet terminal and includes a display having the display surface that is the touch screen. The position detecting device 3 may, however, be a digitizer having no display surface. In the following, the description continues on the assumption that the position detecting device 3 is the tablet terminal.

The position detecting device 3 includes a sensor electrode group 30 placed immediately below the touch screen, the sensor integrated circuit 31, and a host processor 32 configured to control the functions of the respective circuits of the position detecting device 3.

The sensor electrode group 30 serves as a mutual capacitance touch sensor and has a configuration in which a plurality of sensor electrodes 30X and a plurality of sensor electrodes 30Y are arranged in a matrix. The plurality of sensor electrodes 30X are each extended in the Y direction illustrated in FIG. 1 and include a plurality of linear conductors arranged at equal intervals in the X direction orthogonal to the Y direction. Further, the plurality of sensor electrodes 30Y are each extended in the X direction and include a plurality of linear conductors arranged at equal intervals in the Y direction. In FIG. 1, the plurality of sensor electrodes 30X and the plurality of sensor electrodes 30Y are each only partly illustrated. The plurality of sensor electrodes 30Y may also serve as a common electrode of the display, and the position detecting device 3 in such a case is called "in-cell type" as described later.

The sensor integrated circuit 31 detects a specified position of each of the active pens 2 on the touch screen, and has a function of receiving data that each of the active pens 2 has transmitted by using the downlink signal DS and a function of detecting a position of a finger on the touch screen. In the case where the position detecting device 3 is the in-cell type, the sensor integrated circuit 31 further has a function of applying a common potential necessary for display operation to the plurality of sensor electrodes 30Y.

The details of the sensor integrated circuit 31 are described later with reference to FIG. 9, but only the functions of the sensor integrated circuit 31 that are related to the active pen 2 are first described. The sensor integrated circuit 31 has a function of transmitting the uplink signal US to each of the active pens 2 through the sensor electrode group 30, and a function of receiving the downlink signal DS that each of the active pens 2 has transmitted through the sensor electrode group 30. In a case where the burst signal in the downlink signal DS is received, the sensor integrated circuit 31 derives the specified position of the active pen 2 on the basis of the reception level of the burst signal in each of the sensor electrodes 30X and 30Y, and supplies the specified position to the host processor 32. Further, in a case where the data signal in the downlink signal DS is received, the sensor integrated circuit 31 demodulates the data signal to extract data that the active pen 2 has transmitted, and supplies the data to the host processor 32.

The host processor 32 is a central processing unit configured to control the entire position detecting device 3. The host processor 32 is configured so that various applications such as drawing applications and communication applications are operable on the host processor 32. The drawing application plays a role of generating, on the basis of a series of positions of the active pen 2 or the finger sequentially supplied from the sensor integrated circuit 31, stroke data representing the loci of the active pen 2 or the finger on the touch screen, storing the stroke data, and rendering the stored stroke data. Further, when the supply of data that the active pen 2 has transmitted is received from the sensor integrated circuit 31, the drawing application controls, for example, the line width, transparency, and line color of the stroke data to be rendered depending on the supplied data.

Figure 2:
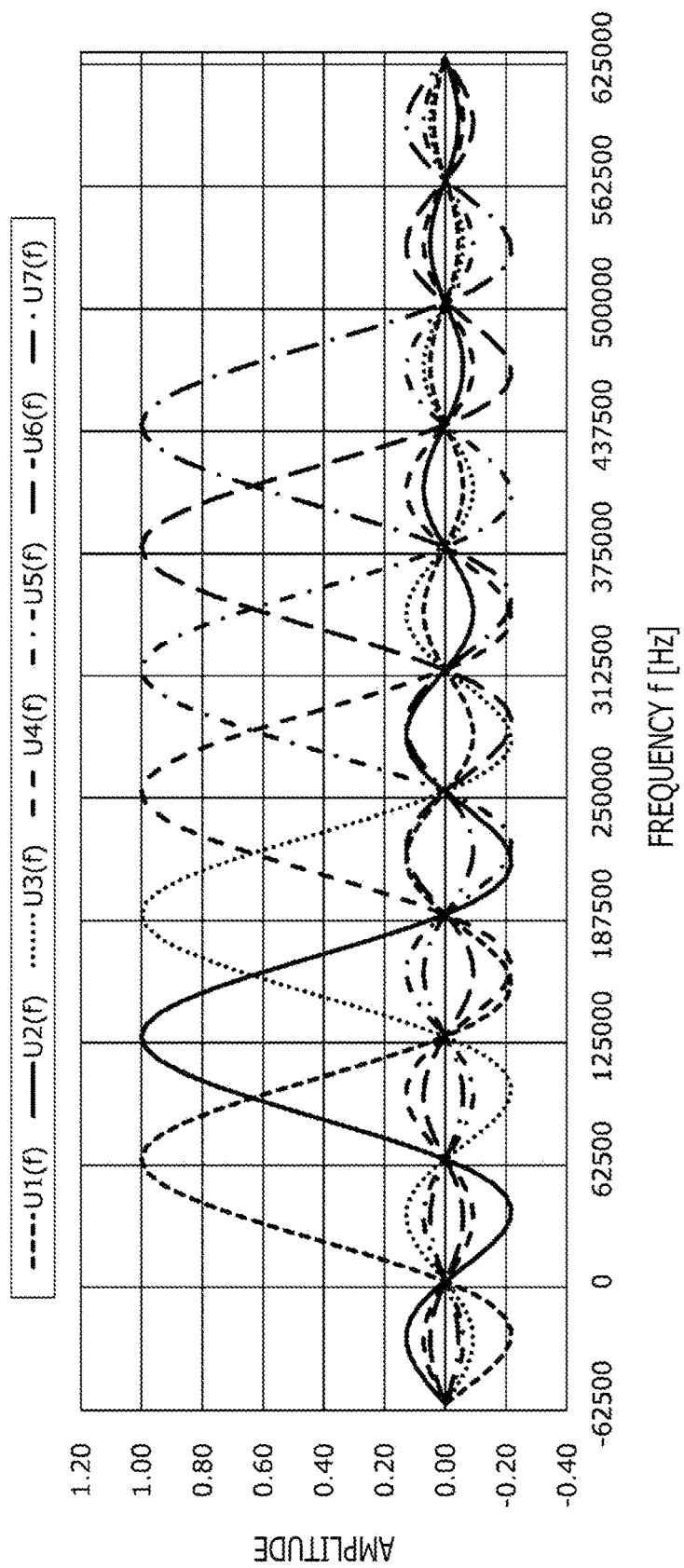
FIG. 2 is a diagram illustrating the principle of orthogonal frequency division multiplexing (OFDM).

Here, OFDM mentioned above is described. FIG. 2 is a diagram illustrating the principle of OFDM. FIG. 2 illustrates the frequency spectrums of a signal $U1(f)$ to a signal $U7(f)$ each of which is transmitted and received by OFDM, and the horizontal axis represents a frequency f and the vertical axis represents an amplitude.

The signal $U1(f)$ to the signal $U7(f)$ form a signal group and are designed so that center frequencies $f_1$ to $f_7$ of the respective signals are orthogonal to each other. The signal $U1(f)$ to the signal $U7(f)$ satisfy Expression (1) below. Here, T is the symbol duration and $\delta_{ij}$ is a delta function that is 1 when i=j is satisfied and is 0 when i≠j is satisfied.

[Equation 1]

$$\int_0^T \sin(2\pi f_i t)\sin(2\pi f_j t) = \delta_{ij}(i,j=1,\ldots 7) \quad (1)$$

With the signal U1(f) to the signal U7(f) designed in this way, as illustrated in FIG. 2, the signal voltage density of another signal is 0 at the center frequency of each signal, and hence, on the reception side, these signals can be received in a distinguished manner even when these signals are received in an overlapped manner. Specifically, the signal U1(f) to the signal U7(f) can be received in a distinguished manner by performing, for each frequency, processing including performing the computations of Equation (2) and Equation (3) below with respect to a reception signal f(t) and determining bits on the basis of the result.

[Equations 2 and 3]

$$\int_0^T f(t)\sin(2\pi f_i t) \ (i,j=1,\ldots 7) \quad (2)$$

$$\int_0^T f(t)\cos(2\pi f_i t) \ (i,j=1,\ldots 7) \quad (3)$$

Such OFDM is generally used in the field of wireless communication as described above, and in general, is used to allow one transmission device to transmit a large amount of data in a multiplexed manner. In contrast to this, in the present embodiment, the different frequencies are assigned to the respective active pens 2 and the downlink signals DS are transmitted with the use of the assigned frequencies, with the result that the simultaneous transmission (multi-pen transmission) of the downlink signals DS by the plurality of active pens 2 is achieved.

Figure 3:
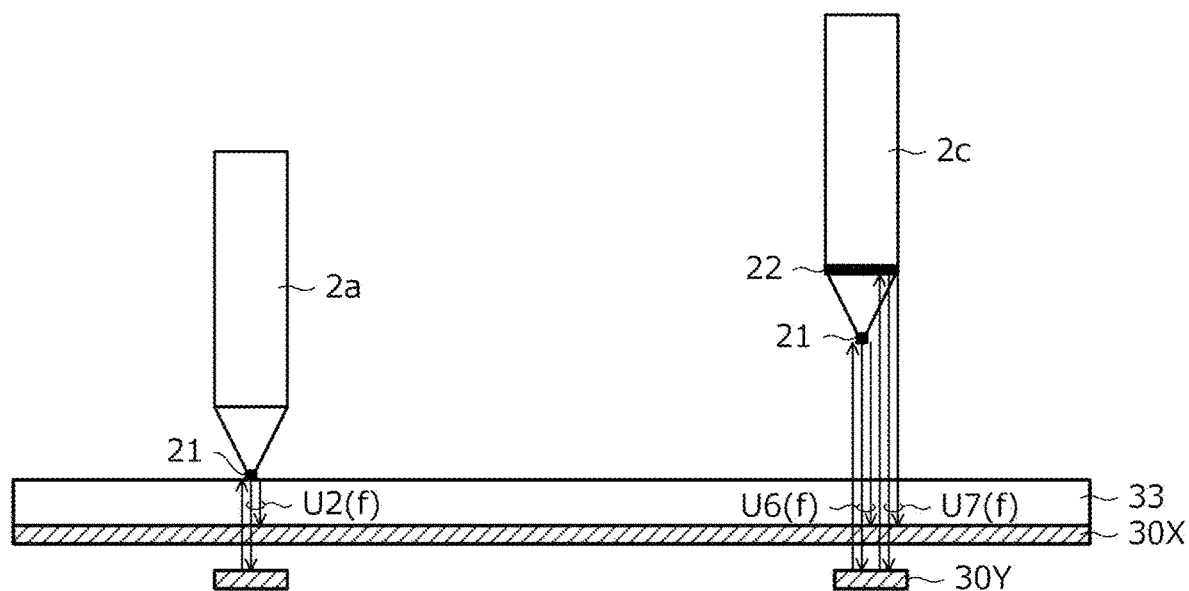
FIG. 3 is a diagram illustrating an example in which active pens 2a and 2c are positioned on the same sensor electrode, namely, a sensor electrode 30X.

A more specific example is described. FIG. 3 is a diagram illustrating an example in which the active pens 2a and 2c, which are also illustrated in FIG. 1, are positioned on the same sensor electrode, namely, the sensor electrode 30X. In FIG. 3, the downward arrows represent the downlink signals DS while the upward arrows represent the uplink signals US. Further, in FIG. 3, a glass plate 33 placed on the sensor electrode group 30 is also illustrated. The touch screen of the position detecting device 3 includes the surface of the glass plate 33. In the example in FIG. 3, the downlink signal DS that is transmitted from the electrode 21 of the active pen 2a is the signal U2(f) illustrated in FIG. 2, the downlink signal DS that is transmitted from the electrode 21 of the active pen 2c is the signal U6(f) illustrated in FIG. 2, and the downlink signal DS that is transmitted from the electrode 22 of the active pen 2c is the signal U7(f) illustrated in FIG. 2.

Figure 4:
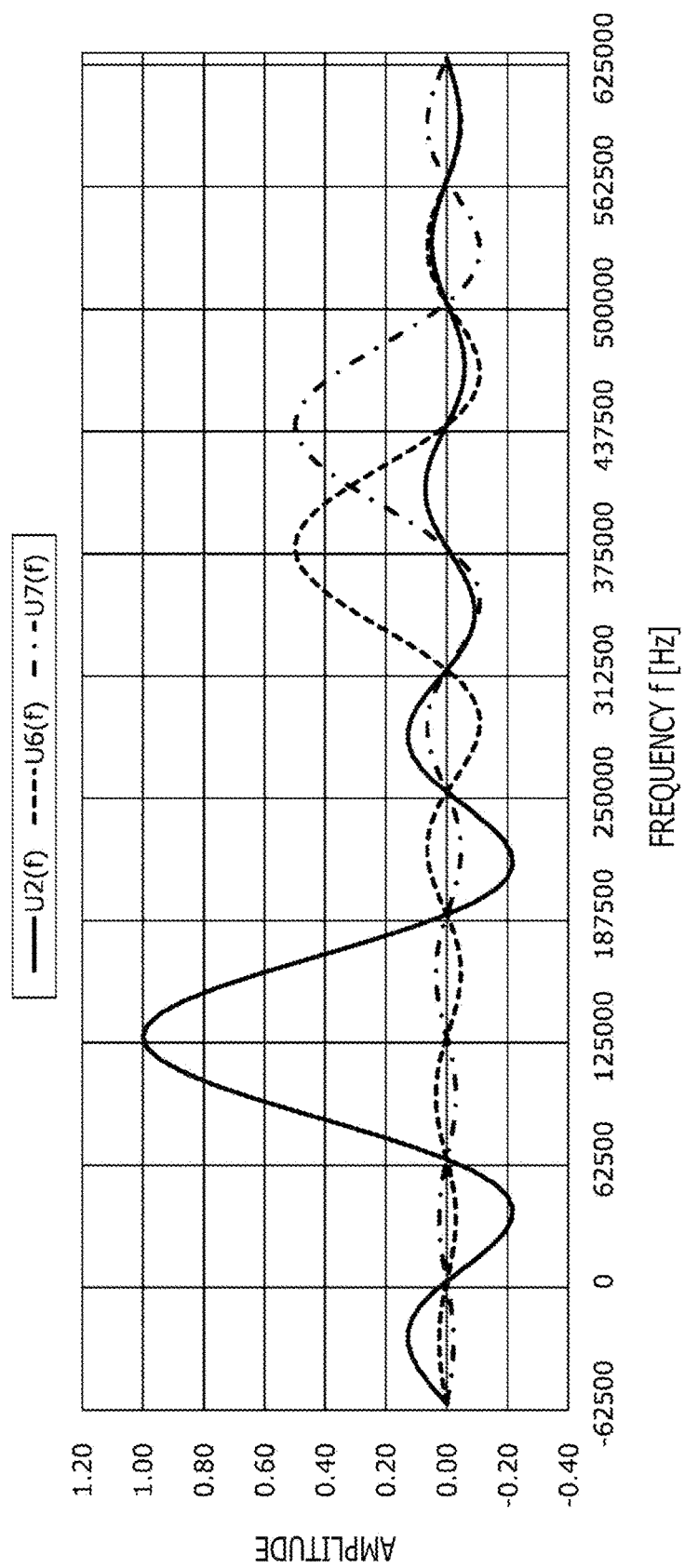
FIG. 4 is a diagram illustrating the frequency spectrums of signals that are detected by the sensor electrode 30X in the example in FIG. 3.

FIG. 4 is a diagram illustrating the frequency spectrums of the signals that are detected by the sensor electrode 30X in the example in FIG. 3. By the sensor electrode 30X, the signals U2(f), U6(f), and U7(f) are detected in an overlapped manner. As illustrated in FIG. 4, however, the signal voltage densities of the signals U6(f) and U7(f) are 0 at the center frequency of the signal U2(f), and hence the sensor integrated circuit 31 observes the amplitude of the center frequency of the signal U2(f), thereby being capable of acquiring the downlink signal DS that the active pen 2a has transmitted. In a similar manner, the signal voltage densities of the signals U2(f) and U7(f) are 0 at the center frequency of the signal U6(f), and hence the sensor integrated circuit 31 observes the amplitude of the center frequency of the signal U6(f), thereby being capable of acquiring the downlink signal DS that the active pen 2c has transmitted from the electrode 21. Further, the signal voltage densities of the signals U2(f) and U6(f) are 0 at the center frequency of the signal U7(f), and hence the sensor integrated circuit 31 observes the amplitude of the center frequency of the signal U7(f), thereby being capable of acquiring the downlink signal DS that the active pen 2c has transmitted from the electrode 22.

Note that, in the example in FIG. 4, the peaks of the signals U6(f) and U7(f) are smaller than that of the amplitude of the signal U2(f) because the active pen 2a is in a pen-down state (a state where the pen tip is in contact with the touch screen) while the active pen 2c is in a hover state (a state where the pen tip is away from the touch screen) as illustrated in FIG. 3. The position detecting device 3 has to detect the positions of not only the active pen 2 in the pen-down state in which the amplitude is large, but also the active pen 2 in the hover state in which the amplitude is small. When the center frequencies of the downlink signals DS that are transmitted from the respective active pens 2 are orthogonal to each other as illustrated in FIG. 4, however, it is possible to avoid a situation that the downlink signal DS of the active pen 2 providing a large amplitude (in the pen-down state) affects the reception level of the downlink signal DS of the active pen 2 providing a small amplitude (in the hover state).

Now, the configuration of the active pen 2 for transmitting the downlink signal DS according to the present embodiment is described in detail, and thereafter the configuration of the sensor integrated circuit 31 for receiving the downlink signal DS according to the present embodiment is described in detail.

Figure 5:
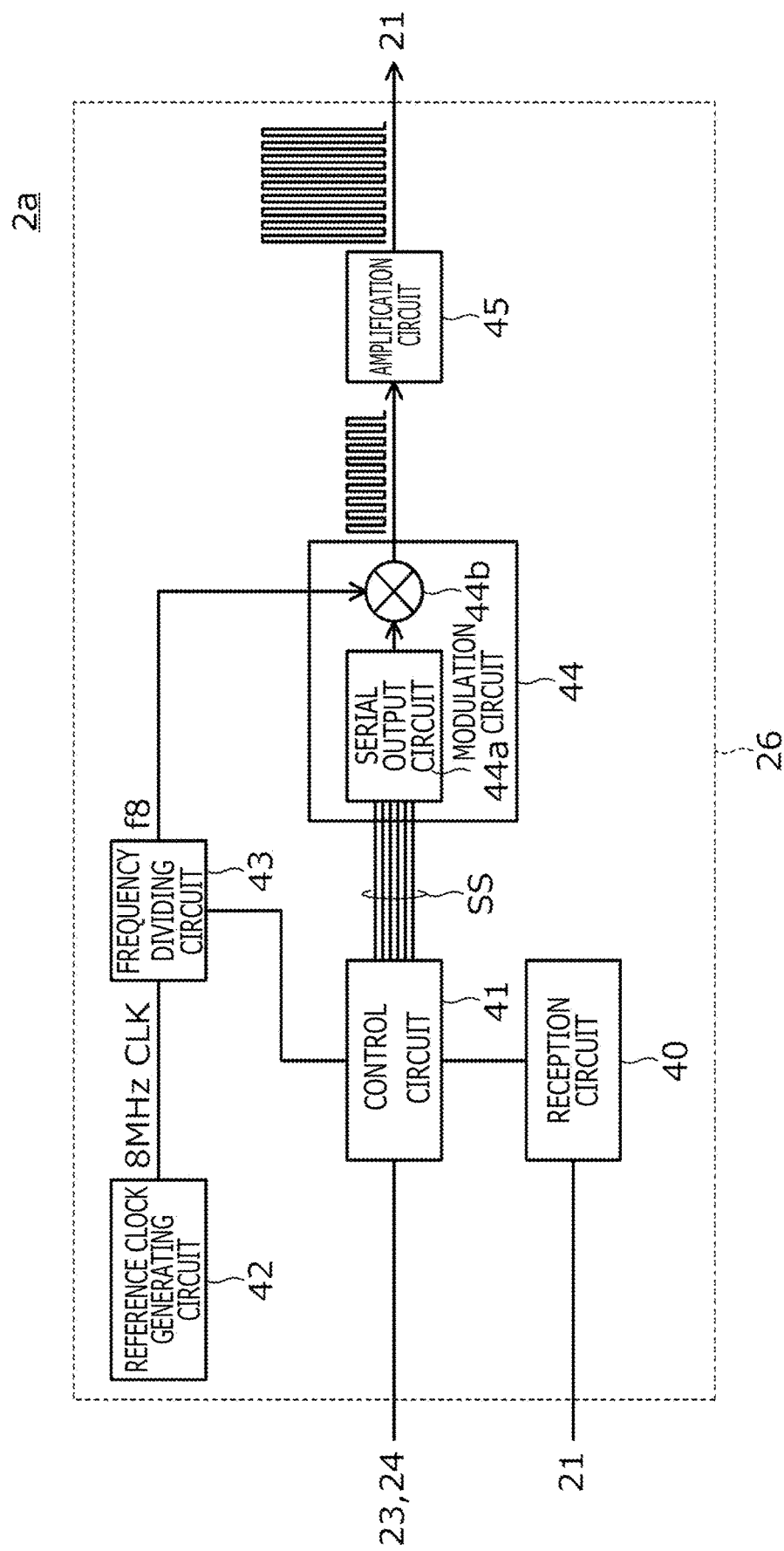

FIG. 5 is a diagram illustrating the functional blocks of the signal processing circuit 26 in the active pen 2a. Although not illustrated, the signal processing circuit 26 in the active pen 2b has similar functional blocks. As illustrated in FIG. 5, the signal processing circuit 26 in the active pen 2a includes a reception circuit 40, a control circuit 41, a reference clock generating circuit 42, a frequency dividing circuit 43, a modulation circuit 44, and an amplification circuit 45.

The reception circuit 40 is a detection circuit configured to detect the uplink signal US received by the electrode 21. The reception circuit 40 acquires the start timing of the frame on the basis of the reception timing of the uplink signal US, and notifies the control circuit 41 of the start timing. Further, the reception circuit 40 demodulates the uplink signal US to acquire a command that the sensor integrated circuit 31 has transmitted, and supplies the command to the control circuit 41.

The control circuit 41 is a processor having a function of controlling the respective circuits in the active pen 2, and includes a built-in memory, which is not illustrated. In this memory, various pieces of information associated with the transmission and reception of the uplink signal US and the downlink signal DS are stored in advance. The information includes, for example, frame duration, the position of each time slot in the frame, one or more combinations of the plurality of time slots included in the frame that are to be used for the transmission of the downlink signal DS, the number of bits that are transmitted in one time slot, and the symbol duration of the downlink signal DS. The control circuit 41 controls, on the basis of these pieces of information and the uplink signal US received by the reception circuit 40, the modulation circuit 44 to transmit the downlink signal DS.

Here, the symbol duration is a time period corresponding to a unit of time of the demodulation processing in the position detecting device 3 configured to detect the downlink signal DS, and is set to a value common among a plurality of frequencies that may be used for the transmission of the downlink signals DS in the present embodiment. Thus, the symbol durations of the downlink signals DS that are transmitted from the respective active pens 2 have the same value irrespective of the frequencies of the downlink signals DS, and hence the position detecting device 3 can receive the downlink signals DS transmitted from the respective active pens 2 without performing complex computation for acquiring phases. This point is more specifically described later.

The operation of the control circuit 41 is specifically described. First, the control circuit 41 acquires the position of each time slot in the frame on the basis of the start timing of the frame notified from the reception circuit 40. Further, on the basis of the command (setting data) supplied from the reception circuit 40, the control circuit 41 determines a frequency that is used for the transmission of the downlink signal DS, the content of data that is to be transmitted in the downlink signal DS, and one or more time slots to be used for the transmission of the downlink signal DS. Of those, the frequency is one of six kinds of frequencies f4, f5, f7, f8, f10, and f14 described later, and the control circuit 41 sets the determined frequency to the frequency dividing circuit 43.

The data that is transmitted by the downlink signal DS includes, for example, pen pressure that is detected by the pen pressure detecting circuit 23, switch information representing the ON/OFF state of the switch 24, and a pen ID written in advance in the memory, which is not illustrated, in the control circuit 41. In a case where the determined data content is the pen pressure, the control circuit 41 acquires pen pressure from the pen pressure detecting circuit 23. In a case where the determined data content is the switch information, the control circuit 41 acquires switch information from the switch 24. In a case where the determined data content is the pen ID, the control circuit 41 acquires a pen ID from the built-in memory. The control circuit 41 generates, on the basis of the thus acquired various pieces of data, a data signal that is to serve as the downlink signal DS, and adds a predetermined burst signal to the data signal, to thereby generate the downlink signal DS.

The control circuit 41 that has generated the downlink signal DS determines, on the basis of the content of the generated downlink signal DS, a symbol string SS to be transmitted in each of the determined one or more time slots. Note that, in a portion of the symbol string SS that corresponds to the burst signal the phase of the pulse signal is determined to repeatedly take the same value. Thus, the burst signal is a tone signal that is obtained through repetitive transmission of the pulse signal taking the same phase. The control circuit 41 supplies the determined symbol string SS to the modulation circuit 44, in parallel, at a timing depending on each time slot (at a timing having a reference to the uplink signal US, i.e., the uplink signal US serving as a reference).

The reference clock generating circuit 42 is a circuit configured to generate a clock signal CLK (reference clock) that is a pulse signal having a predetermined frequency. In FIG. 5 and the subsequent figures, this predetermined frequency is 8 MHz, but as a matter of course, another frequency may be used. In the following, the description continues on the assumption that the clock signal CLK is a pulse signal having 8 MHz.

Figure 7:
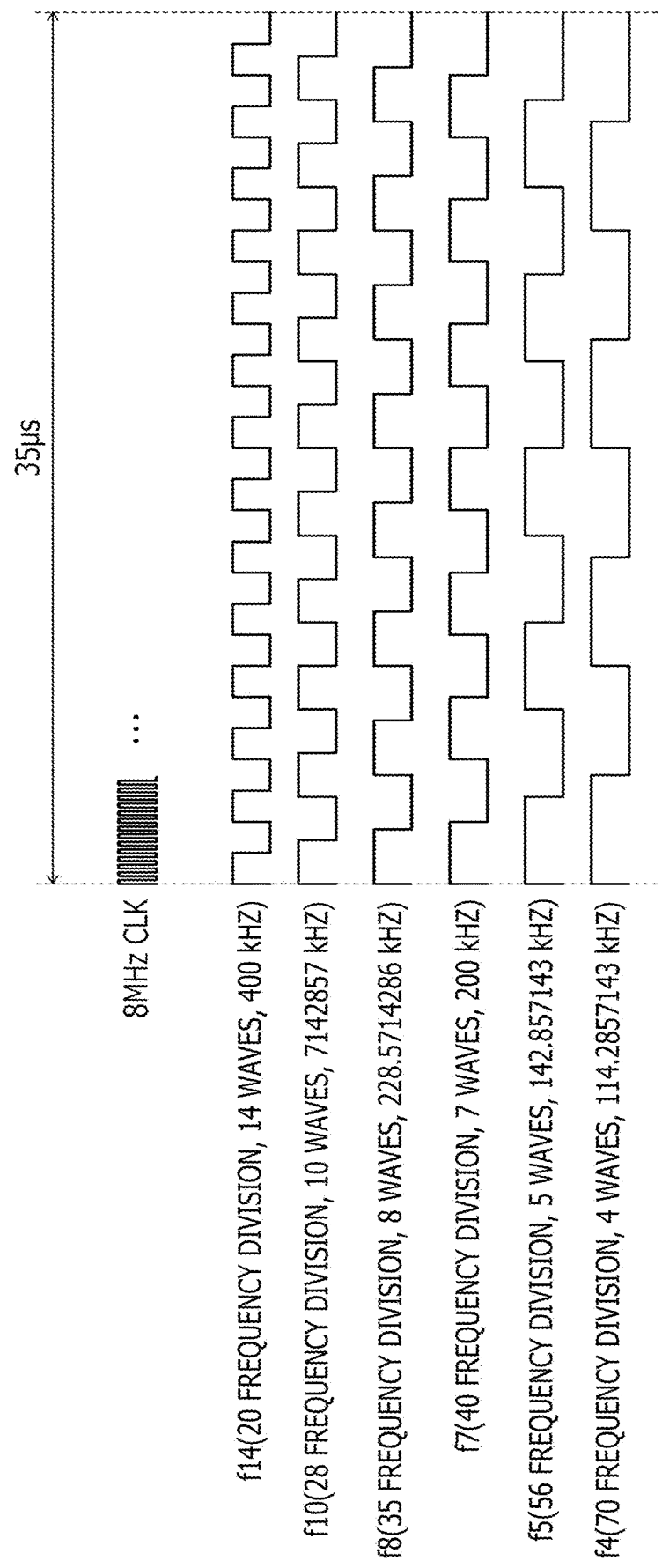
FIG. 7 is a diagram illustrating examples of a clock signal CLK that is generated by a reference clock generating circuit 42 and a plurality of carrier waves that are generated by a frequency dividing circuit 43.

The frequency dividing circuit 43 is configured to frequency-divide the clock signal CLK at a frequency division ratio based on each of the plurality of frequencies (the six kinds of frequencies f4, f5, f7, f8, f10, and f14 described later) different from each other, to thereby generate a plurality of carrier waves having frequencies different from each other. Specifically, the frequency dividing circuit 43 performs frequency division to generate a carrier wave having a frequency (for example, frequency f8) set by the control circuit 41. The carrier wave that is output from the frequency dividing circuit 43 may be a pulse signal as illustrated in FIG. 7 referred to later.

The modulation circuit 44 is a transmission circuit (transmission unit) configured to modulate the carrier wave (first carrier wave) generated by the frequency dividing circuit 43 with the value of a symbol (a value of a first symbol), which is a transmission target and which is supplied from the control circuit 41, and transmit a signal (a first downlink signal) obtained as a result of the modulation in the symbol duration stored in advance in the memory of the control circuit 41.

To be specific, the modulation circuit 44 includes, as illustrated in FIG. 5, a serial output circuit 44a and a mixer 44b. The serial output circuit 44a serially supplies the symbol string SS one symbol by one symbol, which are supplied from the control circuit 41 in parallel, to the mixer 44b.

The mixer 44b is a circuit configured to control, with the value of the symbol that is supplied from the serial output circuit 44a, the phase of the carrier wave generated by the frequency dividing circuit 43. Specifically, the mixer 44b multiplies the value of the symbol that is supplied from the serial output circuit 44a by the carrier wave generated by the frequency dividing circuit 43. The phase control by the mixer 44b is executed by BPSK. That is, the mixer 44b controls the phase of the carrier wave so that the phase is 0 in a case where the value of the symbol that is supplied from the serial output circuit 44a is 0, and controls the phase of the carrier wave so that the phase is $\pi$ in a case where the value of the symbol that is supplied from the serial output circuit 44a is 1.

The mixer 44b supplies a signal corresponding to one symbol, which is obtained as a result of the phase control, to the amplification circuit 45 in the symbol duration stored in advance in the memory of the control circuit 41. The amplification circuit 45 amplifies the signal supplied from the mixer 44b in this way, and supplies the resultant to the electrode 21. In this way, the downlink signal DS having the symbol duration, which is common among the plurality of frequencies that may be used for the transmission of the downlink signals DS, is transmitted from the electrode 21 to the sensor integrated circuit 31.

Figure 6:
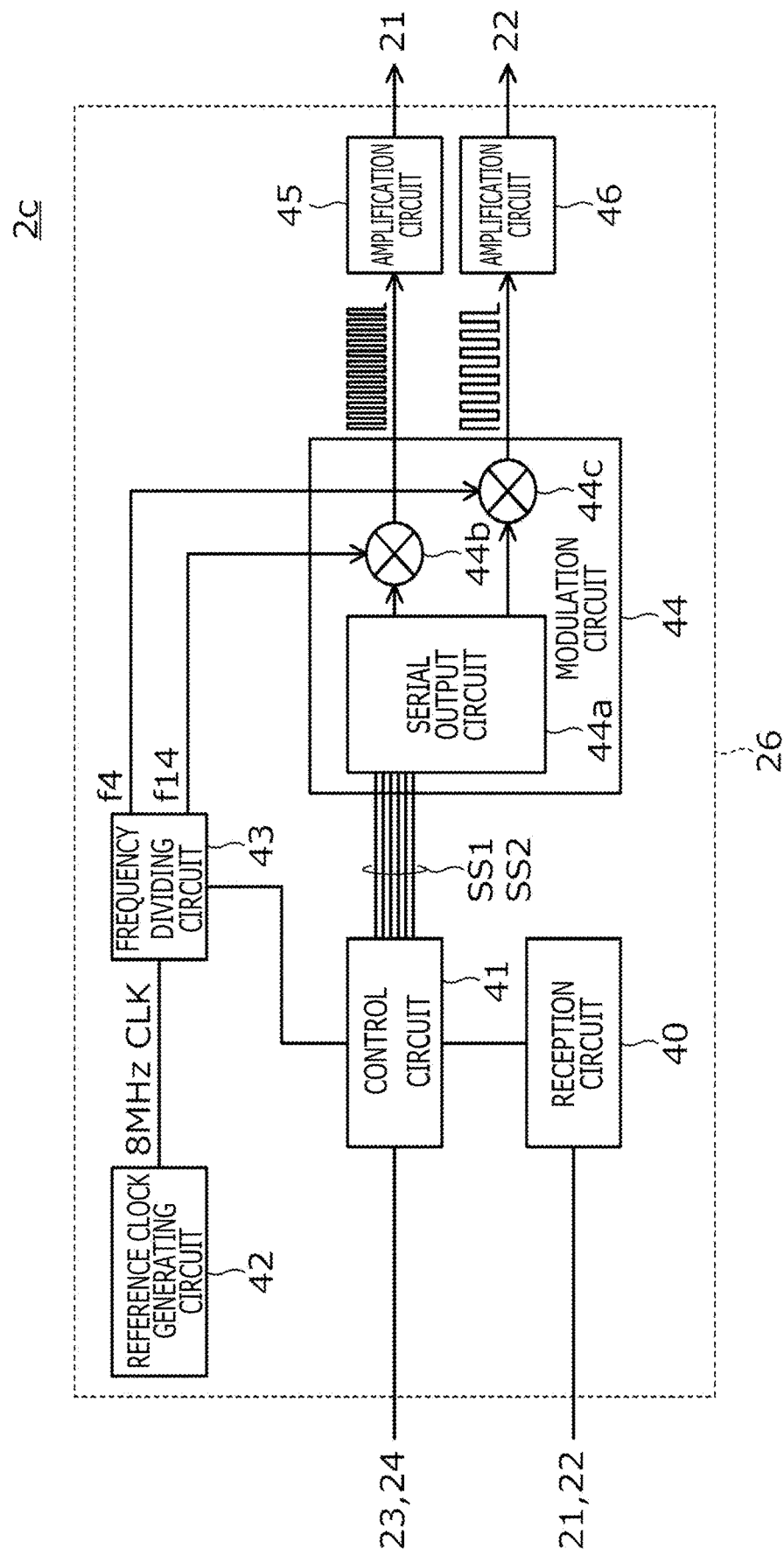
FIG. 6 is a diagram illustrating the functional blocks of the signal processing circuit 26 in the active pen 2c.

FIG. 6 is a diagram illustrating the functional blocks of the signal processing circuit 26 in the active pen 2c. The functional blocks in FIG. 6 are different from the functional blocks of the active pen 2a illustrated in FIG. 5 in that the signal processing circuit 26 further includes an amplification circuit 46, the frequency dividing circuit 43 generates two kinds of carrier waves, and a mixer 44c is further provided in the modulation circuit 44. Now, description is made by paying attention to the differences from the active pen 2a.

The control circuit 41 of the active pen 2c determines two frequencies that are used for the transmission of the downlink signals DS on the basis of the command (setting data) supplied from the reception circuit 40. The control circuit 41 sets each of the determined two frequencies to the frequency dividing circuit 43. The frequency dividing circuit 43 performs frequency division to generate a carrier wave for each of the two frequencies (for example, frequencies f4 and f14) set by the control circuit 41.

Further, the control circuit 41 determines, on the basis of the downlink signals DS generated on the basis of data acquired from the pen pressure detecting circuit 23, for example, a symbol string SS1 to be transmitted from the electrode 21 (the first electrode) in each of the one or more time slots, and a symbol string SS2 to be transmitted from the electrode 22 (the second electrode) in each of the one or more time slots. Then, the control circuit 41 supplies the symbol strings SS1 and SS2 to the modulation circuit 44, in parallel, at a timing depending on each time slot.

The serial output circuit 44a serially supplies the symbol string SS1 one symbol by one symbol, which are supplied from the control circuit 41 in parallel, to the mixer 44b, and serially supplies the symbol string SS2 one symbol by one symbol, which are supplied from the control circuit 41 in parallel, to the mixer 44c.

The mixer 44b controls, with the values of the symbols (the values of first symbols) that are sequentially supplied from the serial output circuit 44a, the phase of one of the two carrier waves (the first carrier wave) generated by the frequency dividing circuit 43. Further, the mixer 44c controls, with the values of the symbols (the values of second symbols) that are sequentially supplied from the serial output circuit 44a, the phase of the other of the two carrier waves (the second carrier wave) generated by the frequency dividing circuit 43.

The mixers 44b and 44c each supply the signal corresponding to one symbol, which is obtained as a result of the phase control, to the amplification circuit 45 or 46 in the symbol duration stored in advance in the memory of the control circuit 41. The amplification circuit 45 amplifies the signal supplied from the mixer 44b, and supplies the resultant to the electrode 21. The amplification circuit 46 amplifies the signal supplied from the mixer 44c, and supplies the resultant to the electrode 22. In this way, from the electrodes 21 and 22, the downlink signals DS (the first and second downlink signals) having the symbol duration, which is common among the plurality of frequencies that may be used for the transmission of the downlink signals DS, are transmitted.

Now, the six kinds of frequencies f4, f5, f7, f8, f10, and f14 that may be set to the frequency dividing circuit 43 are described in detail.

FIG. 7 is a diagram illustrating examples of the clock signal CLK that is generated by the reference clock generating circuit 42 and the plurality of carrier waves that are generated by the frequency dividing circuit 43. In FIG. 7, waveforms corresponding to one symbol duration (for example, 35 μsec) are illustrated. As illustrated in FIG. 7, the clock signal CLK and each carrier wave includes a pulse signal.

As the frequencies that are set to the frequency dividing circuit 43, frequencies may be selected which each has a period whose integer multiple matches the common symbol duration and which are orthogonal to each other. The six kinds of frequencies f4, f5, f7, f8, f10, and f14 illustrated in FIG. 7 are examples of frequencies that may be selected in this way. To be specific, the frequency f4 is a frequency that is obtained by 70-frequency-dividing the clock signal CLK and has approximately 114.2857143 kHz, and the four waves thereof precisely correspond to 35 μsec. The frequency f5 is a frequency that is obtained by 56-frequency-dividing the clock signal CLK and has approximately 142.857143 kHz, and the five waves thereof precisely correspond to 35 μsec. The frequency f7 is a frequency that is obtained by 40-frequency-dividing the clock signal CLK and has 200 kHz, and the seven waves thereof precisely correspond to 35 μsec. The frequency f8 is a frequency that is obtained by 35-frequency-dividing the clock signal CLK and has approximately 228.5714286 kHz, and the eight waves thereof precisely correspond to 35 μsec. The frequency f10 is a frequency that is obtained by 28-frequency-dividing the clock signal CLK and has approximately 285.7142857 kHz, and the 10 waves thereof precisely correspond to 35 μsec. The frequency f14 is a frequency that is obtained by 20-frequency-dividing the clock signal CLK and has 400 kHz, and the 14 waves thereof precisely correspond to 35 μsec.

Figure 8:
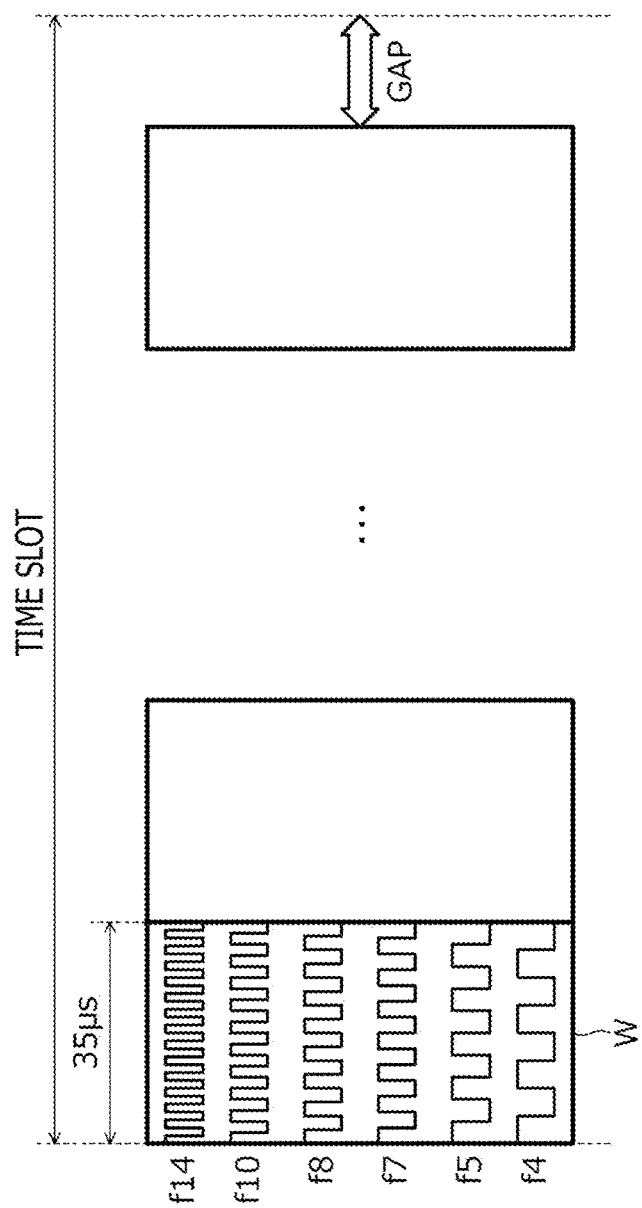
FIG. 8 is a diagram illustrating a window W of a downlink signal DS (a signal corresponding to one symbol) that is transmitted at each of six kinds of frequencies f4, f5, f7, f8, f10, and f14.

FIG. 8 is a diagram illustrating the window W of the downlink signal DS (a signal corresponding to one symbol) that is transmitted at each of the six kinds of frequencies f4, f5, f7, f8, f10, and f14. According to the present embodiment, the symbol duration is fixed irrespective of the frequency of the downlink signal DS, and hence the duration of the window W also has a fixed value irrespective of the frequency. As a result, in the sensor integrated circuit 31 configured to receive the downlink signals DS, there is no need to change the position of the window W depending on the frequency of the downlink signal DS, and hence it is possible to avoid complex computation for phase acquisition in the sensor integrated circuit 31. Further, the total durations of the downlink signals DS that the respective active pens 2 transmit in one time slot are equal to each other, and hence it is also possible to reduce the difference in unused time in one time slot between the active pens 2.

As described above, according to the active pen 2 of the present embodiment, the duration of the window W of the downlink signal DS that each of the active pens 2 transmits is equal to the common symbol duration, with the result that it is possible to avoid complex computation for phase acquisition on the side of the sensor integrated circuit 31 configured to receive the downlink signal DS. It becomes also possible to generate carrier waves for the downlink signals DS using a simple configuration, namely, the frequency dividing circuit. Further, the total durations of the downlink signals DS that the respective active pens 2 transmit are equal to each other, and hence it is also possible to reduce the difference in unused time in one time slot between the active pens 2.

Next, the configuration of the sensor integrated circuit 31 for receiving the downlink signals DS according to the present embodiment is described in detail.

Figure 9:
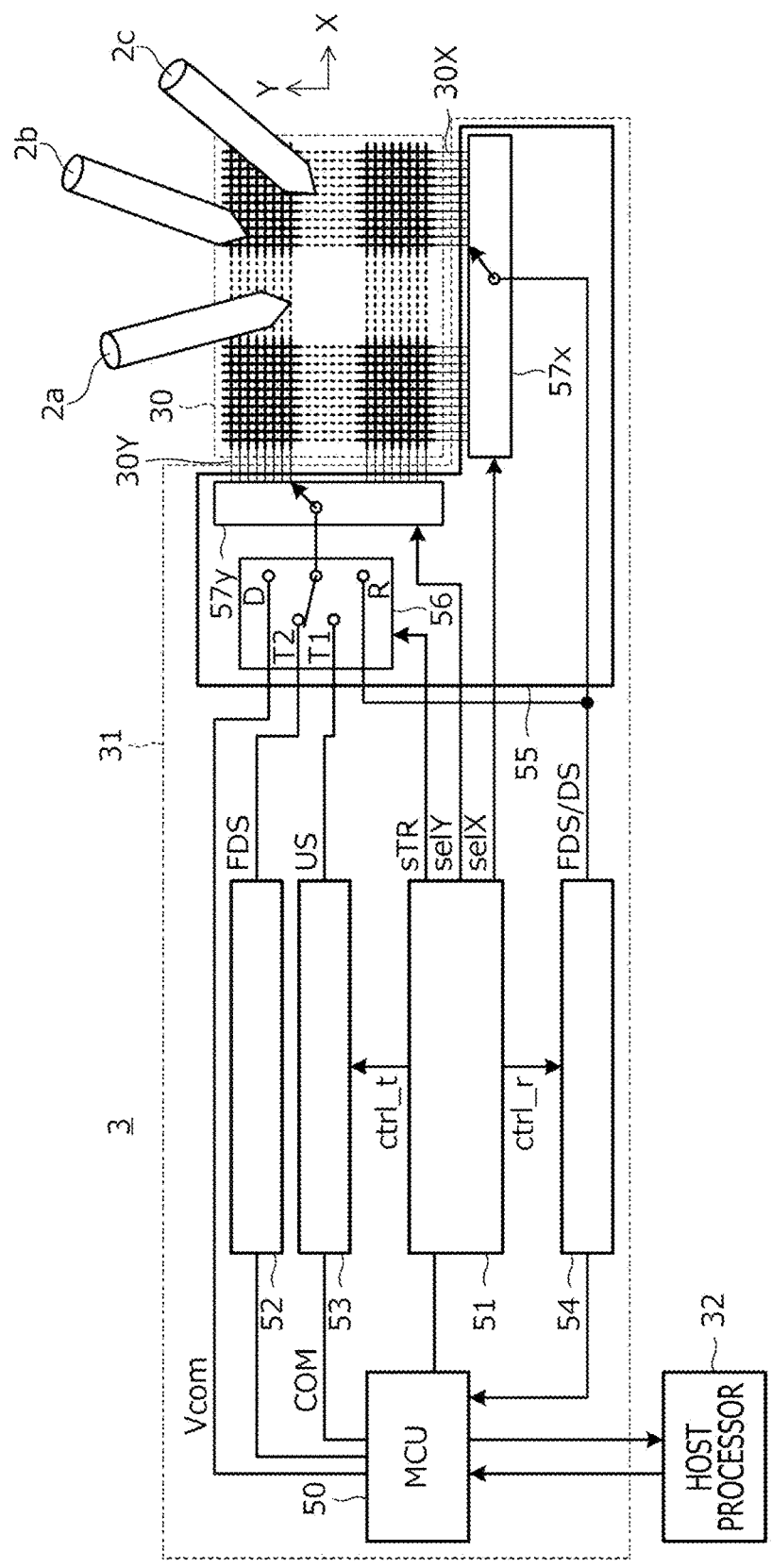
FIG. 9 is a diagram illustrating the internal configurations of a sensor electrode group 30 and a sensor integrated circuit 31.

FIG. 9 is a diagram illustrating the internal configurations of the sensor electrode group 30 and the sensor integrated circuit 31. As described above, the sensor electrode group 30 includes the plurality of sensor electrodes 30X and the plurality of sensor electrodes 30Y. In the case where the touch screen includes the display surface of the display, one of the sensor electrodes 30X and 30Y is also used as the common electrode in the display. The position detecting device 3 of a type in which one of the sensor electrodes 30X and 30Y is used as the common electrode in the display is called "in-cell type," for example. Meanwhile, the position detecting device 3 of a type in which the sensor electrodes 30X and 30Y are provided separately from the common electrode in the display is called "out-cell type" or "on-cell type," for example. In the following, the description continues on the assumption that the position detecting device 3 is the in-cell type, but the present invention is also applicable to an out-cell or on-cell position detecting device in a similar manner.

When the display executes pixel driving processing, it is necessary to maintain the potential of the common electrode at a predetermined common potential Vcom. Thus, in the position detecting device 3 of the in-cell type, the sensor integrated circuit 31 cannot execute communication with the active pen 2 and finger detection while the display is executing the pixel driving processing. The host processor 32 accordingly utilizes a horizontal blanking interval and a vertical blanking interval, in which the pixel driving processing is not being performed, to control the sensor integrated circuit 31 to execute communication with the active pen 2 and finger detection. Specifically, with one frame being the display period of one screen, the host processor 32 regards the horizontal blanking interval and the vertical blanking interval included in one frame as the time slots, and controls the sensor integrated circuit 31 to execute communication with the active pen 2 and finger detection in each of these time slots.

The sensor integrated circuit 31 includes, as illustrated in FIG. 9, an MCU 50, a logic circuit 51, transmission circuits 52 and 53, a reception circuit 54, and a selection circuit 55.

The MCU 50 and the logic circuit 51 serve as a control circuit configured to control the transmission circuits 52 and 53, the reception circuit 54, and the selection circuit 55, to thereby control the transmission and reception operation of the sensor integrated circuit 31. To be specific, the MCU 50 is a microprocessor internally including a read only memory (ROM) and a random access memory (RAM) and configured to execute programs stored in the ROM and the RAM to operate. The MCU 50 also has a function of outputting the common potential Vcom and a command COM. The command COM corresponds to the command included in the uplink signal US described above. Meanwhile, the logic circuit 51 outputs control signals ctrl_t, ctrl_r, sTR, selX, and selY on the basis of control by the MCU 50.

An instruction by the command COM that the MCU 50 outputs includes information (setting data) representing the assignment of one or more time slots and frequency to each electrode included in each of the active pens 2 being detected, and the content of data that the active pen 2 is to transmit in the data signal in the downlink signal DS. The MCU 50 determines, on the basis of, for example, the number of the active pens 2 being detected, one or more time slots and a frequency that are assigned to each of the active pens 2, and arranges the results of the determination in the command COM.

The transmission circuit 52 is a circuit configured to generate, on the basis of control by the MCU 50, a finger detection signal FDS that is used for detecting the finger. The finger detection signal FDS is a signal including K pulse trains each including K pulses (data of "1" or "−1"), for example. Here, K represents the number of the sensor electrodes 30Y. Further, the content of the K pulse trains (that is, the combinations of the K pulses) are all different from each other.

The transmission circuit 53 is a circuit configured to generate the uplink signal US on the basis of the command COM that is supplied from the MCU 50 and the control signal ctrl_t from the logic circuit 51. Specifically, the transmission circuit 53 adds a predetermined preamble to the leading end of the command COM that is supplied from the MCU 50. The transmission circuit 53 spreads a symbol string obtained as a result of the addition with a predetermined spreading code (for example, a 11-chip-length spreading code having an autocorrelation characteristic), and performs modulation by a circular shift, for example, to thereby generate the uplink signal US.

The selection circuit 55 includes a switch 56 and conductor selecting circuits 57x and 57y.

The switch 56 is a switch element configured so that a common terminal and any one of a terminal T1, a terminal T2, a terminal D, and a terminal R are connected to each other. Of those, the terminal T2 is actually a group of terminals, the number of which corresponds to the number of the sensor electrodes 30Y. The common terminal of the switch 56 is connected to the conductor selecting circuit 57y.

The terminal T1 is connected to the output end of the transmission circuit 53, the terminal T2 is connected to the output end of the transmission circuit 52, the terminal D is connected to the output end of the MCU 50 from which the common potential Vcom is output, and the terminal R is connected to the input end of the reception circuit 54.

The conductor selecting circuit 57x is a switch element configured to selectively connect the plurality of sensor electrodes 30X to the common terminal of the switch 56. The conductor selecting circuit 57x is configured to simultaneously connect a part or all of the plurality of sensor electrodes 30X to the common terminal of the switch 56.

The conductor selecting circuit 57y is a switch element configured to selectively connect the plurality of sensor electrodes 30Y to the input end of the reception circuit 54. The conductor selecting circuit 57y is configured to simultaneously connect a part or all of the plurality of sensor electrodes 30Y to the input end of the reception circuit 54. Further, in a case where the terminal T2 and the common terminal are connected to each other in the switch 56, the conductor selecting circuit 57y connects the plurality of terminals serving as the terminal T2 and the plurality of sensor electrodes 30Y to each other on a one-to-one basis.

To the selection circuit 55, the three control signals sTR, selX, and selY are supplied from the logic circuit 51. Specifically, the control signal sTR is supplied to the switch 56, the control signal selX is supplied to the conductor selecting circuit 57x, and the control signal selY is supplied to the conductor selecting circuit 57y. The logic circuit 51 controls the selection circuit 55 by using the control signals sTR, selX, and selY, to thereby achieve transmission of the uplink signal US or the finger detection signal FDS, the application of the common potential Vcom, and the reception of the downlink signal DS or the finger detection signal FDS.

In the case where the transmission of the uplink signal US is performed, the logic circuit 51 controls the selection circuit 55 so that all of the sensor electrodes 30Y are simultaneously connected to the input end of the transmission circuit 53.

With regard to the reception of the downlink signal DS, the logic circuit 51 performs different controls between a case where the downlink signal DS is received in order to detect the active pen 2 that has not been detected (global scan), and a case where the downlink signal DS is received from the active pen 2 that has been detected (sector scan). To be specific, first, in the case where the global scan is performed, the logic circuit 51 controls the selection circuit 55 so that all of the sensor electrodes 30X and 30Y are sequentially connected to the input end of the reception circuit 54. Next, with regard to the case where the sector scan is performed, the logic circuit 51 performs the following controls. First, in a case where the burst signal is received, the logic circuit 51 controls the selection circuit 55 so that a few of the sensor electrodes 30X and a few of the sensor electrodes 30Y positioned in the vicinity of the specified position of the active pen 2 are sequentially connected to the input end of the reception circuit 54. Next, in a case where the data signal is received, the logic circuit 51 controls the selection circuit 55 so that the sensor electrode 30X or the sensor electrode 30Y that is closest to the specified position of the active pen 2 is connected to the input end of the reception circuit 54.

In the case where the finger detection signal FDS is transmitted and received, the logic circuit 51 controls the selection circuit 55 so that the plurality of terminals serving as the terminal T2 of the switch 56 and the plurality of sensor electrodes 30X are connected to each other on a one-to-one basis. Then, while maintaining that state, the logic circuit 51 controls the selection circuit 55 so that the plurality of sensor electrodes 30X are selected one by one, and the selected sensor electrode 30X is connected to the reception circuit 54.

In the case where the application of the common potential Vcom is performed, the logic circuit 51 controls the selection circuit 55 so that all of the sensor electrodes 30Y are simultaneously connected to the terminal D of the switch 56. Thus, the potential of each of the sensor electrodes 30Y is equal to the common potential Vcom.

The reception circuit 54 is a circuit configured to receive, on the basis of the control signal ctrl_r from the logic circuit 51, the finger detection signal FDS that the transmission circuit 52 has transmitted and the downlink signal DS that the active pen 2 has transmitted. At a timing at which the finger detection signal FDS is received, the reception circuit 54 acquires K current values of each of the sensor electrodes 30X, and calculates, for each of the above-mentioned K pulse trains, the inner product of the K pulses of the pulse train and the acquired K current values, to thereby calculate a detection level at an intersection point between each of the sensor electrodes 30X and each of the sensor electrodes 30Y. Then, the reception circuit 54 determines an area being touched in the touch screen (touched area) on the basis of the result of the calculation, and outputs the touched area to the host processor 32 via the MCU 50.

Meanwhile, at a timing at which the downlink signal DS is received, on the basis of charges induced in the sensor electrode group 30, the reception circuit 54 detects, in a distinguished manner, the plurality of downlink signals DS transmitted from one or more active pens 2 by using one of a predetermined plurality of frequencies (for example, the above-mentioned six kinds of frequencies f4, f5, f7, f8, f10, and f14) different from each other. The reception circuit 54 detects the specified position on the basis of each of the plurality of detected downlink signals DS, and demodulates the value of a symbol transmitted by each of the plurality of detected downlink signals DS.

Figure 10:
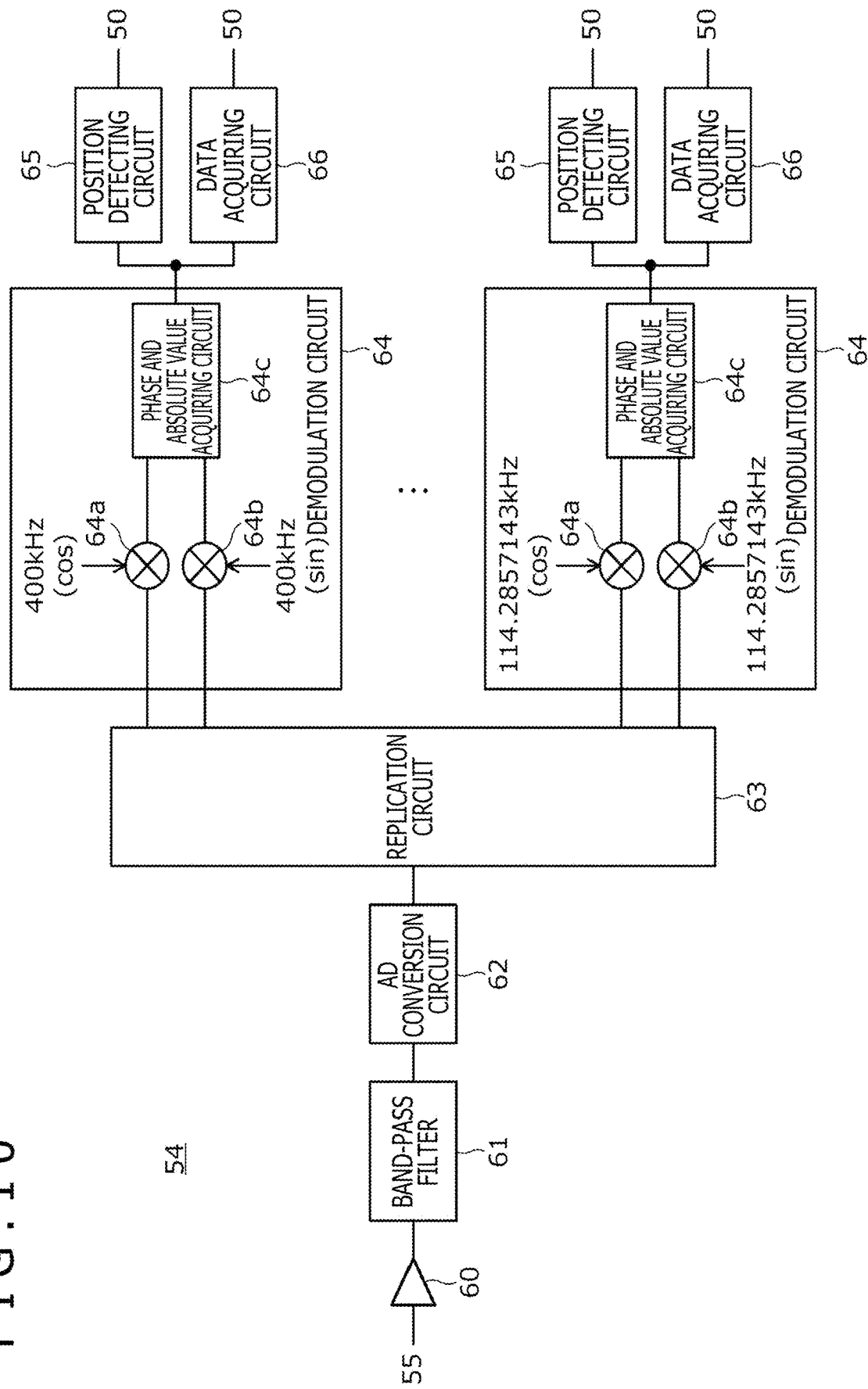
FIG. 10 is a diagram illustrating a configuration for receiving the downlink signals DS, which is provided in a reception circuit 54.

FIG. 10 is a diagram illustrating a configuration for receiving the downlink signals DS, wherein the configuration is provided in the reception circuit 54. As illustrated in FIG. 10, the reception circuit 54 includes a buffer 60, a band-pass filter 61, an AD conversion circuit 62, a replication circuit 63, demodulation circuits 64, position detecting circuits 65, and data acquiring circuits 66. Of those, the demodulation circuit 64, the position detecting circuit 65, and the data acquiring circuit 66 are provided for each of the plurality of frequencies that are used for the transmission of the downlink signal DS.

The input terminal of the buffer 60 is connected, through the selection circuit 55, to any one of the plurality of sensor electrodes 30X and 30Y (a sensor electrode that has been connected to the reception circuit 54 by the selection circuit 55) of the sensor electrode group 30. The buffer 60 plays a role of amplifying current that is induced in the sensor electrode connected to the input terminal, and supplying the current to the band-pass filter 61.

The band-pass filter 61 is a filter circuit configured to remove low frequency noise and harmonic noise from the current that is supplied from the buffer 60. The low frequency noise that is removed by the band-pass filter 61 includes, for example, low frequency noise from a power supply device that may exist near the position detecting device 3.

The AD conversion circuit 62 is a circuit configured to sample and quantize the current output from the band-pass filter 61, to thereby acquire a reception level value corresponding to charges induced in the corresponding sensor electrode. Note that, the sampling frequency of the AD conversion circuit 62 is set to a frequency sufficiently higher than the frequency of the pulse signal of the downlink signal DS (for example, the frequency of the clock signal CLK illustrated in FIG. 7). The AD conversion circuit 62 successively supplies the acquired reception level values to the replication circuit 63.

The replication circuit 63 is a circuit configured to replicate a series of the reception level values that are supplied from the AD conversion circuit 62, and supply the replicas to the plurality of demodulation circuits 64 in parallel.

The plurality of demodulation circuits 64 are each a circuit configured to perform, on the series of the reception level values supplied from the replication circuit 63, frequency analysis at the corresponding frequency to acquire the downlink signal DS transmitted at the corresponding frequency, and perform phase analysis on the acquired downlink signal DS per the symbol duration (the symbol duration that is common among the plurality of frequencies) described above, to thereby acquire the value of a symbol transmitted by the acquired downlink signal DS. As illustrated in FIG. 10, the plurality of demodulation circuits 64 each include mixers 64a and 64b and a phase and absolute value acquiring circuit 64c.

The mixers 64a and 64b are each a circuit configured to multiply the series of the reception level values that are supplied from the replication circuit 63 by a carrier wave at the corresponding frequency. To the mixer 64a, a carrier wave is supplied, which is reproduced from the series of the reception level values by a reproduction circuit, which is not illustrated. Further, to the mixer 64b, a carrier wave is supplied, which is obtained by shifting the phase of this carrier wave by $\pi/2$. The two mixers 64a and 64b are used to check a change in phase, instead of the phase of the downlink signal DS itself, so that the downlink signal DS can be correctly received even when the phase is rotated during the transmission and reception of the downlink signal DS. Such a demodulation scheme is generally called differential binary phase-shift keying (DBPSK).

The phase and absolute value acquiring circuit 64c acquires, on the basis of the signal output from each of the mixers 64a and 64b, the downlink signal DS transmitted at the corresponding frequency. Then, the phase and absolute value acquiring circuit 64c performs phase analysis on the acquired downlink signal DS per the symbol duration (the symbol duration that is common among the plurality of frequencies) described above, to thereby acquire the value of a symbol transmitted by the acquired downlink signal DS. The fact that the phase and absolute value acquiring circuit 64c can perform phase analysis in the common symbol duration in this way (that is, there is no need to change the symbol duration between the frequencies) is one of technical advantages of the present invention. Further, the phase and absolute value acquiring circuit 64c also performs absolute value analysis to acquire the level value of the acquired downlink signal DS.

The position detecting circuit 65 is a circuit configured to detect the specified position of the active pen 2 on the basis of the above-mentioned level value acquired by the corresponding phase and absolute value acquiring circuit 64c with respect to each of the plurality of sensor electrodes 30X and 30Y (all of the sensor electrodes 30X and 30Y in the case of the global scan and a few of the sensor electrodes 30X and a few of the sensor electrodes 30Y positioned in the vicinity of the specified position of the active pen 2 in the case of the sector scan). The specified position thus detected is a specified position of the active pen 2 that has transmitted the downlink signal DS at the corresponding frequency. The position detecting circuit 65 outputs the detected specified position to the host processor 32 illustrated in FIG. 9 via the MCU 50.

The data acquiring circuit 66 is a circuit configured to acquire, on the basis of the value of the symbol acquired by the corresponding phase and absolute value acquiring circuit 64c, the data that the active pen 2 has transmitted. The thus detected data is data transmitted by the active pen 2 that has transmitted the downlink signal DS at the corresponding frequency. The data acquiring circuit 66 outputs the acquired data to the host processor 32 illustrated in FIG. 9 via the MCU 50.

As described above, according to the sensor integrated circuit 31 of the present embodiment, the downlink signal DS according to the present embodiment is received from each of the active pens 2, and hence the specified position of each of the active pens 2 and the data that each of the active pens 2 has transmitted can be acquired.

The preferred embodiment of the present invention is described above, but the present invention is by no means limited to the embodiment. As a matter of course, the present invention can be embodied in various modes without departing from the principles of the present invention.

For example, in the present embodiment, the modulation circuit 44 transmits each symbol in the symbol duration stored in advance in the memory of the control circuit 41 of the active pen 2, but alternatively, wavenumbers may be stored in advance in the memory of the control circuit 41 in association with the respective frequencies, and the modulation circuit 44 may transmit a signal corresponding to a wavenumber depending on the frequency of the downlink signal DS. Also in this case, the duration of the window W of the downlink signal DS that each of the active pens 2 transmits can be equal to the common symbol duration.

The "symbol duration that is common among a plurality of frequencies" in the present embodiment includes a case where there is a difference in symbol duration between the frequencies but the difference does not affect the reception by the sensor integrated circuit 31. That is, the reception operation by the sensor integrated circuit 31 is typically designed by considering a tolerable margin of error for the purpose of absorbing a path difference between the downlink signals DS, for example. Even when the symbol durations corresponding to the respective frequencies are different from each other in within this tolerable error range, the sensor integrated circuit 31 can absorb the difference, and hence the symbol durations may be different between the frequencies as long as the difference does not affect the reception by the sensor integrated circuit 31.

Further, in the example described in the present embodiment, the six kinds of frequencies f4, f5, f7, f8, f10, and f14 are used, each having a period whose integer multiple precisely matches the symbol duration. Similar to the above description, however, a frequency having a period whose integer multiple does not precisely match the symbol duration may be used as long as the frequency does not affect the reception by the sensor integrated circuit 31. More specifically, when the condition is set that the error is 3% or less, more desirably 1% or less, the integer multiple of the period and the symbol duration do not precisely match each other. In this error range, for example, even when 21 symbols are transmitted, error accumulation can be sufficiently suppressed and noise applied to the downlink signals DS having other frequencies can thus be reduced. Further, by using the differential scheme such as DBPSK or quadrature binary phase-shift keying (QBPSK) as the modulation scheme, the effect on the demodulation accuracy of the downlink signal DS, which is the demodulation target, can also be reduced.

Further, the active pen 2, which corresponds to the transmission side, may repeatedly transmit the same data several times (for example, twice or three times) using the same modulation scheme, and the position detecting device 3, which corresponds to the reception side, may use a unit of demodulation that has a length obtained by multiplying the symbol duration (for example, 35 usec) by a natural number (for example, 70 usec or 105 usec). In this way, the signal-to-noise ratio (SN ratio) on the reception side can be improved, and as a result, the bit error rate in bit decoding can be reduced.

Further, in the example described in the present embodiment, the downlink signal DS includes a pulse signal. However, for example, a sine wave filter configured to convert the downlink signal DS into a sinusoidal signal may further be provided on the subsequent stage of the modulation circuit 44 (see FIG. 5 and FIG. 6), and the downlink signal DS output from this sine wave filter may be transmitted. With this configuration, harmonic noise can be reduced.

Further, in the example described in the present embodiment, the carrier wave is modulated by BPSK in order to generate the downlink signal, but as a matter of course, another modulation scheme such as quadrature phase-shift keying (QPSK) or 16 quadrature amplitude modulation (16-QAM) may be used.

Figure 11:
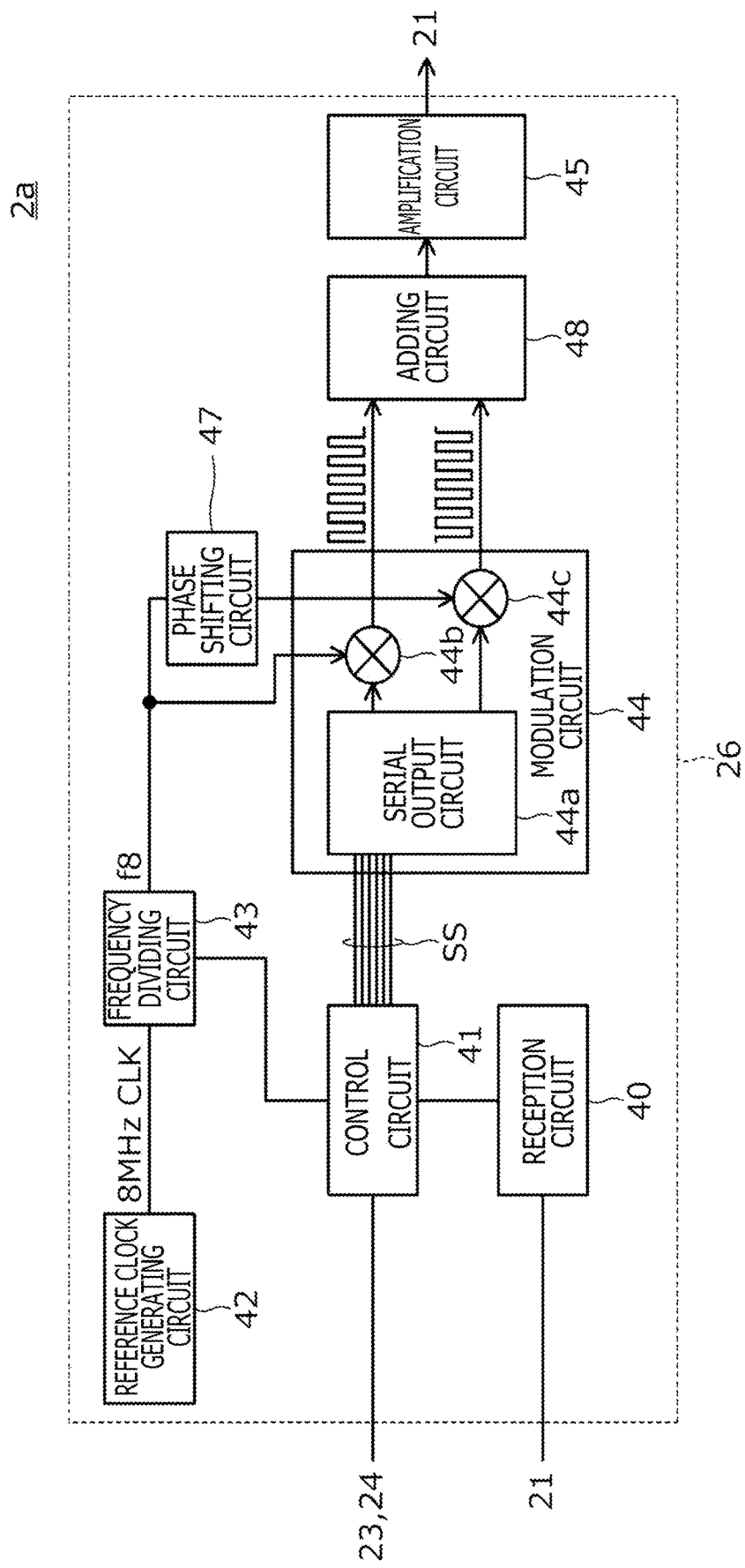

FIG. 11 is a diagram illustrating a first modified example of the active pen 2a according to the present embodiment. The active pen 2a according to the present modified example is different from the active pen 2a illustrated in FIG. 5 in that the phase control on the carrier wave generated by the frequency dividing circuit 43 is performed by QPSK instead of BPSK. Now, description is made by paying attention to the difference.

The active pen 2a according to the present modified example includes a phase shifting circuit 47. The phase shifting circuit 47 has a function of shifting the phase of the carrier wave generated by the frequency dividing circuit 43 by $\pi/2$. To the modulation circuit 44 according to the present modified example, two carrier waves, that is, a carrier wave output from the frequency dividing circuit 43 and a carrier wave output from the phase shifting circuit 47 are supplied. Note that, in the present modified example, the phase shifting circuit 47 is provided separately from the frequency dividing circuit 43, but instead, the frequency dividing circuit 43 may be provided with a phase shifting function.

The modulation circuit 44 includes the mixer 44c in addition to the mixer 44b. In the present modified example, one symbol includes two bits, and the serial output circuit 44a supplies one of the two bits to the mixer 44b and supplies the other bit to the mixer 44c.

The mixer 44b controls, with the values of the bits that are sequentially supplied from the serial output circuit 44a, the phase of the carrier wave output from the frequency dividing circuit 43. Further, the mixer 44c controls, with the values of the bits that are sequentially supplied from the serial output circuit 44a, the phase of the carrier wave output from the phase shifting circuit 47. With this configuration, from the mixer 44b, a pulse signal corresponding to $\cos(2\pi ft)$ or $-\cos(-2\pi ft)$ is output depending on the corresponding bit value, and from the mixer 44c, a pulse signal corresponding to $\sin(\theta)$ or $-\sin(2\pi ft)$ is output depending on the corresponding bit value. Here, f represents the frequency of the carrier wave and t represents time.

The active pen 2a according to the present modified example further includes an adding circuit 48. The adding circuit 48 is a circuit configured to add the signal output from the mixer 44b and the signal output from the mixer 44c together. A signal that is generated by the adding circuit 48 is a pulse signal that corresponds to any of $\cos(2\pi ft+\pi/4)$, $\cos(2\pi ft+3\pi/4)$, $\cos(2\pi ft+5\pi/4)$, and $\cos(2\pi ft+7\pi/4)$ depending on the corresponding symbol value.

The adding circuit 48 supplies the generated signal, one symbol by one symbol, to the amplification circuit 45 in the symbol duration stored in advance in the memory of the control circuit 41. The amplification circuit 45 amplifies the signal supplied from the mixer 44b, and supplies the resultant to the electrode 21. With this configuration, also in the present modified example, the downlink signal DS having the symbol duration, which is common among the plurality of frequencies that may be used for the transmission of the downlink signal DS, is transmitted.

Further, in the example described in the present embodiment, the burst signal and the data signal, which form the downlink signal DS, are sequentially transmitted, but these signals can be simultaneously transmitted according to the principle of the present embodiment. Now, this point is described with a specific example.

Figure 12:
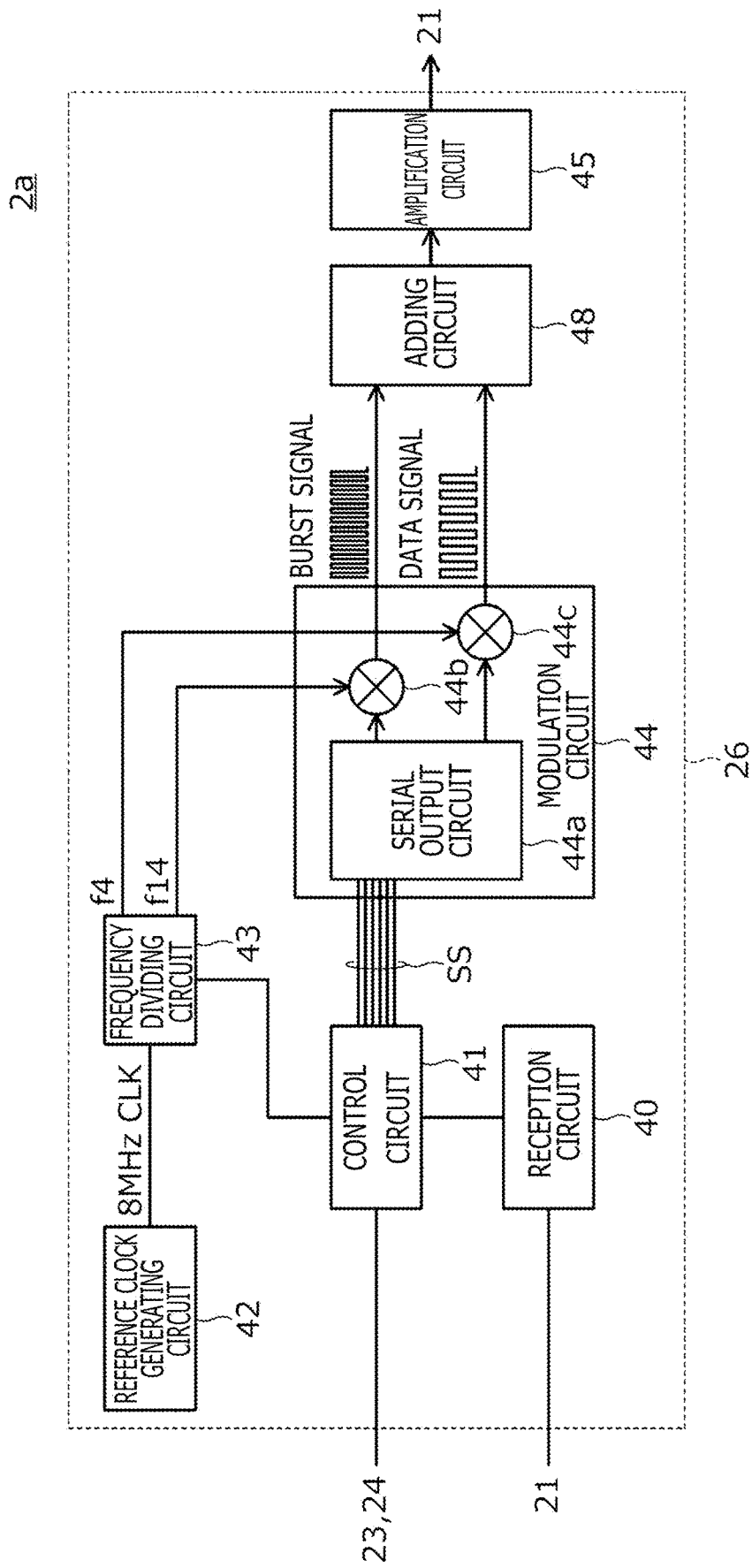

FIG. 12 is a diagram illustrating a second modified example of the active pen 2a according to the present embodiment. The active pen 2a according to the present modified example is different from the active pen 2a illustrated in FIG. 5 in that the burst signal and the data signal are simultaneously transmitted at different frequencies. Now, description is made by paying attention to the difference.

The control circuit 41 of the active pen 2a according to the present modified example determines, on the basis of a command supplied from the reception circuit 40, two frequencies that are used for the transmission of the downlink signals DS. The control circuit 41 sets each of the determined two frequencies to the frequency dividing circuit 43. The frequency dividing circuit 43 performs frequency division to generate a carrier wave for each of the two frequencies (for example, frequencies f4 and f14) set by the control circuit 41.

The modulation circuit 44 includes the mixer 44c in addition to the mixer 44b. The serial output circuit 44a divides the symbol string SS that is supplied from the control circuit 41 into a symbol string of the burst signals and a symbol string of the data signals, and serially supplies the former to the mixer 44b and the latter to the mixer 44c, one symbol by one symbol. The operation of each of the mixers 44b and 44c that have thus received the supply of the symbol strings is similar to that of the active pen 2c described with reference to FIG. 6. In the present modified example, however, signals output from the mixers 44b and 44c are both supplied to the adding circuit 48.

The adding circuit 48 performs, similar to the adding circuit 48 illustrated in FIG. 11, processing of adding the signal output from the mixer 44b and the signal output from the mixer 44c together. A signal obtained by this processing is amplified by the amplification circuit 45 to be supplied to the electrode 21. With this configuration, in the present modified example, although the burst signal and the data signal are transmitted in an overlapped manner, the sensor integrated circuit 31 can divide the signals because the signals are transmitted after being subjected to orthogonal frequency division multiplexing.

In the present embodiment, as illustrated in FIG. 10, the band-pass filter 61 and the AD conversion circuit 62 are provided on the preceding stage of the replication circuit 63 and the multiplication by the mixers 64a and 64b is performed in a digital region, but the multiplication by the mixers 64a and 64b may be performed in an analog region.

Figure 13:
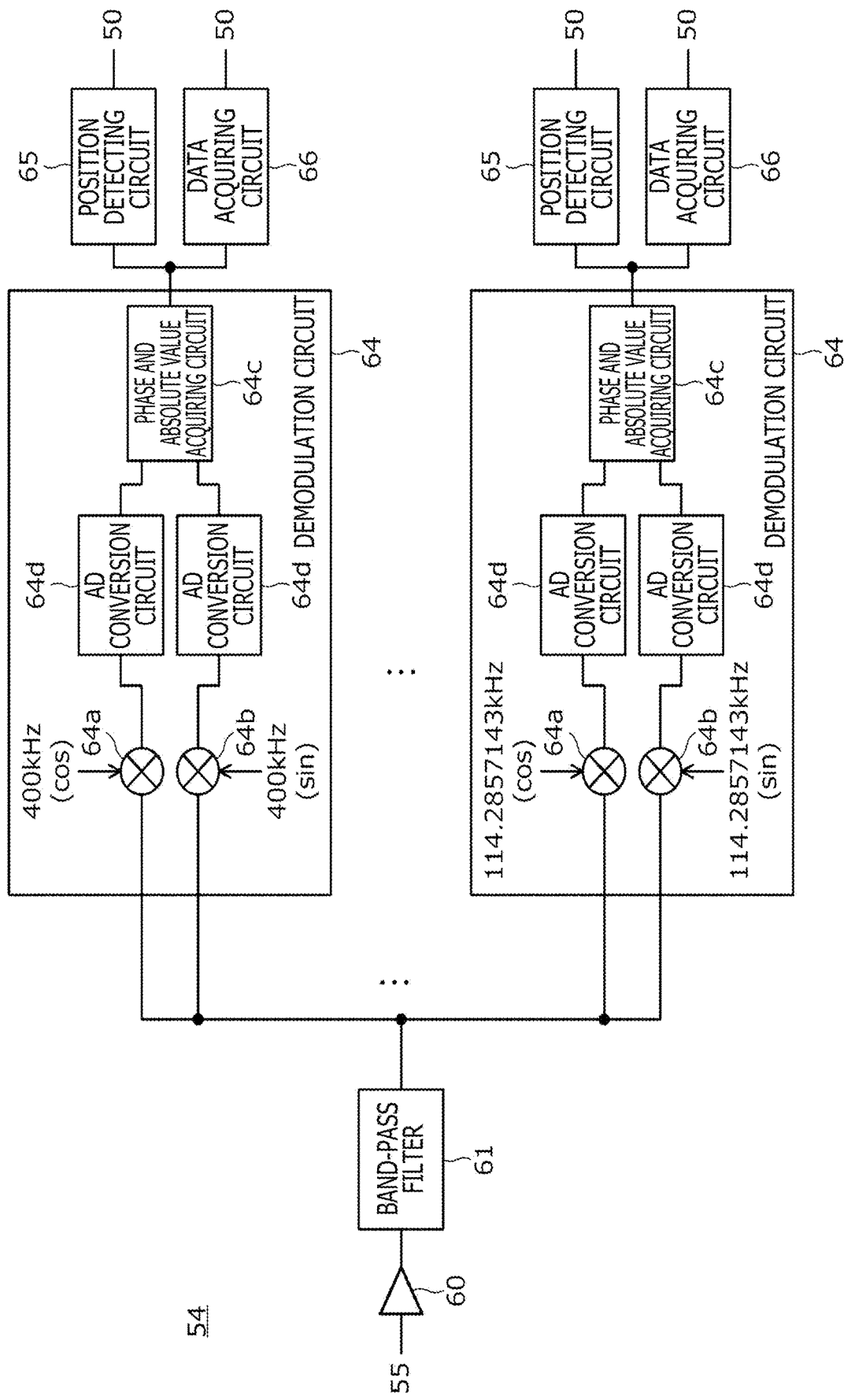
FIG. 13 is a diagram illustrating a configuration for receiving the downlink signals DS, which is provided in the reception circuit 54 in a case where multiplication by mixers 64a and 64b is performed in an analog region.
Figure 14:
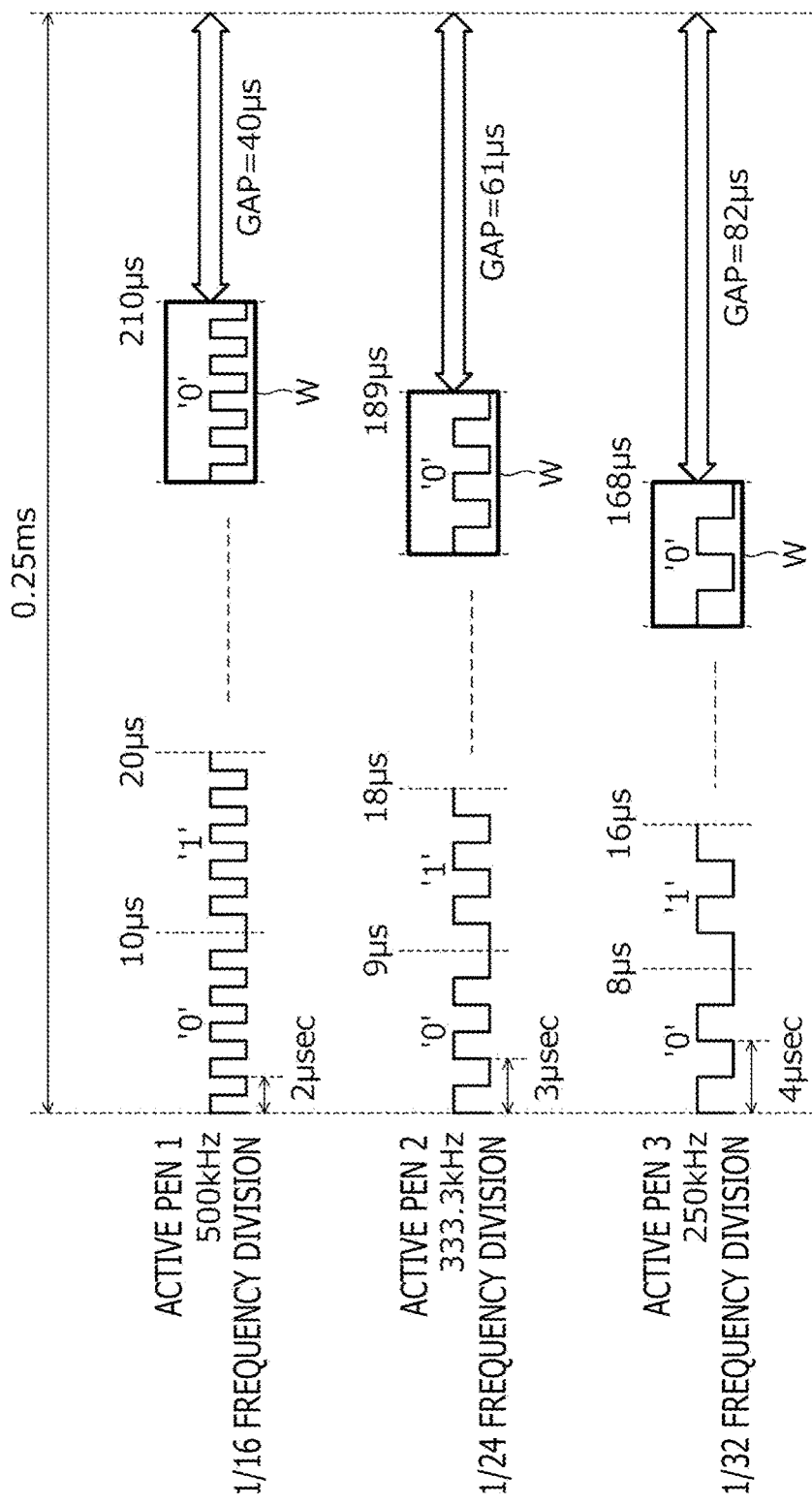
FIG. 14 is a diagram illustrating a configurations of downlink signals according to the background art of the present invention as contemplated by the inventors of the present application.

FIG. 13 is a diagram illustrating a configuration for receiving the downlink signal DS that is provided in the reception circuit 54 in the case where the multiplication by the mixers 64a and 64b is performed in the analog region. As illustrated in FIG. 13, in this case, the input ends of the respective mixers 64a and 64b are both directly connected to the output end of the band-pass filter 61, and an AD conversion circuit 64d is provided between each of the mixers 64a and 64b and the phase and absolute value acquiring circuit 64c. The function of the AD conversion circuit 64d is similar to that of the AD conversion circuit 62 illustrated in FIG. 10. With this configuration, the multiplication by the mixers 64a and 64b can be performed in the analog region.

DESCRIPTION OF REFERENCE SIGNS 2, 2a to 2c Active pen
3 Position detecting device
20 Core
21, 22 Electrode
23 Pen pressure detecting circuit
24 Switch
25 Power supply
26 Signal processing circuit
30 Sensor electrode group
30X, 30Y Sensor electrode
31 Sensor integrated circuit
32 Host processor
33 Glass plate
40 Reception circuit
41 Control circuit
42 Reference clock generating circuit
43 Frequency dividing circuit
44 Modulation circuit
44a Serial output circuit
44b, 44c Mixer
45, 46, 60 Amplification circuit
47 Phase shifting circuit
48 Adding circuit 51 Logic circuit
52, 53 Transmission circuit
54 Reception circuit
55 Selection circuit
56 Switch
57x, 57y Conductor selecting circuit
60 Buffer
61 Band-pass filter
62, 64d AD Conversion circuit
63 Replication circuit
64 Demodulation circuit
64a, 64b Mixer
64c Phase and absolute value acquiring circuit
65 Position detecting circuit
66 Data acquiring circuit
CLK Clock signal
COM Command
ctrl_t, ctrl_r, sTR, selX, selY Control signal
DS Downlink signal
f4, f5, f7, f8, f10, f14 Frequency
FDS Finger detection signal
SS, SS1, SS2 Symbol string
US Uplink signal
Vcom Common potential
W Window

The invention claimed is:

1. An active pen configured to transmit one or more symbol values in one time slot, the active pen comprising:
 a frequency dividing circuit configured to frequency-divide a reference clock with a frequency division ratio based on each of a plurality of frequencies different from each other, to thereby generate a plurality of carrier waves having frequencies different from each other; and
 a transmission circuit configured to transmit a first downlink signal in a symbol duration that is common among the plurality of frequencies, the first downlink signal obtained by modulating a first carrier wave, which is among the plurality of carrier waves generated by the frequency dividing circuit, with a value of a first symbol that is a transmission target.

2. The active pen according to claim 1, wherein the plurality of carrier waves each comprise a pulse signal, and the symbol duration comprises an integer multiple of a period of the pulse signal.

3. The active pen according to claim 1, wherein the symbol duration comprises time corresponding to a unit of time of a demodulation processing in a position detecting device configured to detect the first downlink signal.

4. The active pen according to claim 1, further comprising:
 a first electrode and a second electrode,
 wherein the transmission circuit transmits the first downlink signal from the first electrode, and transmits a second downlink signal from the second electrode in the symbol duration, the second downlink signal obtained by modulating a second carrier wave, which is among the plurality of carrier waves generated by the frequency dividing circuit and which has a frequency different from a frequency of the first carrier wave, with a value of a second symbol that is a transmission target.

5. The active pen according to claim 1, wherein the transmission circuit transmits, simultaneously with the first downlink signal, a second carrier wave in the symbol duration without modulating the second carrier wave, the second carrier wave generated by the frequency dividing circuit and having a frequency different from a frequency of the first carrier wave.

6. The active pen according to claim 1, further comprising:
 a detection circuit configured to detect an uplink signal transmitted from a position detecting device,
 wherein the transmission circuit transmits the first downlink signal at a timing having a reference to the uplink signal detected by the detection circuit.

7. The active pen according to claim 1, further comprising:
 a detection circuit configured to detect an uplink signal transmitted from a position detecting device,
 wherein the frequency dividing circuit selects, based on setting data included in the uplink signal, the first carrier wave from the plurality of carrier waves.

8. The active pen according to claim 1, wherein the transmission circuit includes a sine wave filter configured to convert the first downlink signal into a sinusoidal signal, and transmits the first downlink signal output from the sine wave filter.

9. The active pen according to claim 1, wherein the one or more symbol values each comprise a value representing a plurality of bits.

10. A sensor integrated circuit connected to a sensor electrode group, and configured to detect, based on a charge induced in the sensor electrode group, a plurality of downlink signals transmitted from one or more active pens by using one of a predetermined plurality of frequencies different from each other, to thereby detect a specified position based on each of the detected plurality of downlink signals and demodulate a value of a symbol transmitted in each of the detected plurality of downlink signals, the sensor integrated circuit comprising:
 an analog-to-digital conversion circuit configured to acquire a reception level value corresponding to a charge induced in one of a plurality of sensor electrodes of the sensor electrode group; and
 a plurality of demodulation circuits each corresponding to one of the predetermined plurality of frequencies different from each other, and configured to perform frequency analysis on a series of the reception level values at a corresponding frequency to acquire one of the plurality of downlink signals transmitted at the corresponding frequency, and perform, per a symbol duration that is common among the predetermined plurality of frequencies, phase analysis on the acquired downlink signal, to thereby acquire the value of the symbol transmitted in the acquired downlink signal.

11. The sensor integrated circuit according to claim 10, wherein the plurality of demodulation circuits each further perform absolute value analysis to acquire a level value of the acquired downlink signal, and
 the sensor integrated circuit further comprises a position detecting circuit configured to detect the specified position of the one or more active pens based on the level value acquired for each of the plurality of sensor electrodes of the sensor electrode group.

12. The sensor integrated circuit according to claim 10, wherein the plurality of downlink signals include two downlink signals transmitted from two different electrodes of one of the one or more active pens.

13. The sensor integrated circuit according to claim 10, wherein the plurality of downlink signals include two downlink signals transmitted from electrodes of two of the one or more active pens, respectively.

* * * * *